(12) United States Patent
Gvillo

(10) Patent No.: US 9,794,335 B2
(45) Date of Patent: Oct. 17, 2017

(54) COMPUTER SYSTEM SYNCHRONIZATION

(71) Applicant: The Boeing Company, Chicago, IL (US)

(72) Inventor: Dennis Walter Gvillo, Moro, IL (US)

(73) Assignee: The Boeing Company, Chicago, IL (US)

( * ) Notice: Subject to any disclaimer, the term of this patent is extended or adjusted under 35 U.S.C. 154(b) by 670 days.

(21) Appl. No.: 14/293,974

(22) Filed: Jun. 2, 2014

(65) Prior Publication Data

US 2015/0350317 A1    Dec. 3, 2015

(51) Int. Cl.
*H04L 29/08* (2006.01)
*H04J 3/06* (2006.01)
*G06F 1/14* (2006.01)

(52) U.S. Cl.
CPC ............ *H04L 67/1095* (2013.01); *G06F 1/14* (2013.01); *H04J 3/0638* (2013.01); *H04J 3/0667* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,096,285 B2 | 8/2006 | Ellerbrock et al. | |
| 2007/0063891 A1* | 3/2007 | Matsumoto | G01S 19/29 342/357.62 |
| 2009/0180465 A1* | 7/2009 | Closset | H04L 12/4035 370/350 |
| 2009/0190510 A1* | 7/2009 | Kobayashi | H04L 27/2656 370/280 |
| 2009/0245227 A1* | 10/2009 | Chin | H04B 7/2681 370/350 |
| 2010/0002659 A1* | 1/2010 | Doi | H04B 7/2696 370/338 |
| 2015/0063343 A1* | 3/2015 | Abedini | H04W 56/0045 370/350 |
| 2016/0095078 A1* | 3/2016 | Yamada | H04L 12/437 370/242 |

* cited by examiner

*Primary Examiner* — Natisha Cox
(74) *Attorney, Agent, or Firm* — Kolisch Hartwell, P.C.

(57) ABSTRACT

A method may comprise communicating by a first computer with a second computer over a network during a first frame having a first frame duration; transmitting a first synchronization signal from the first computer to the second computer; receiving by the first computer during the first frame a second synchronization signal from the second computer; determining by the first computer a first elapsed time between a time when the first synchronization signal was transmitted by the first computer and a time when the second synchronization signal was received by the first computer; and determining by the first computer a duration for a second frame based at least in part on the first elapsed time.

17 Claims, 8 Drawing Sheets

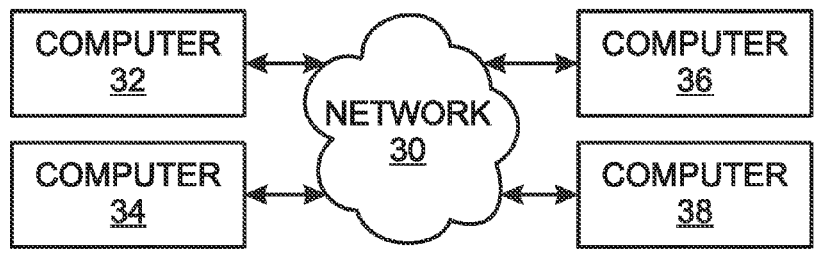
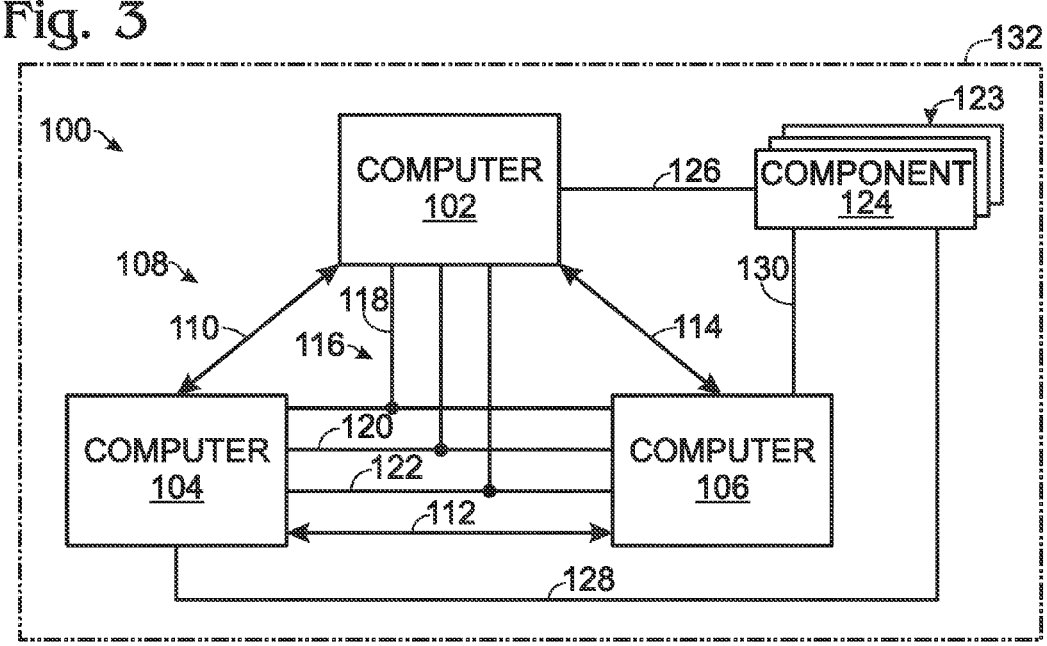

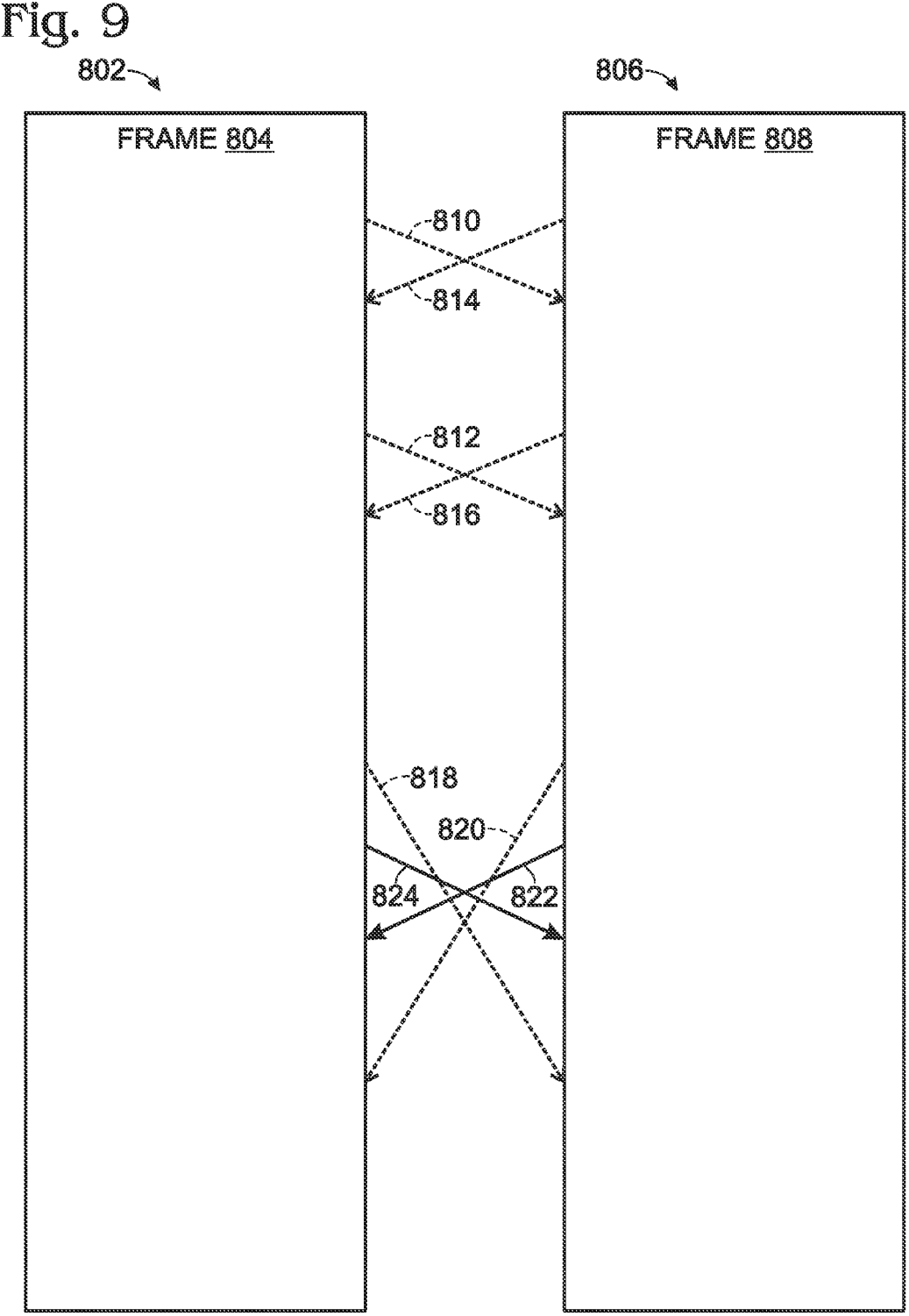

COMPUTER SYSTEM SYNCHRONIZATION

FIELD

This disclosure relates to inter-computer communication. More specifically, the disclosed embodiments relate to systems, products, and methods for synchronizing computers that are in communication.

BACKGROUND

Computer-implemented systems, such as flight control computers (FCCs) or vehicle management system computers (VMSCs), often include a plurality of computers in communication with one another. For example, each computer of the plurality of computers communicates during sequential time periods referred to as frames. During each frame, the respective computers execute various computations and/or instructions, and communicate information associated with these computations and/or instructions over communication links referred to as cross-channel data links, to the other computers.

In some of these computer-implemented systems the frames of the computers are synchronized with one another, so that the computers are all available to share data for the same time periods. However, each computer of the plurality of computers generally powers on at a different time relative to the other computers of the plurality, and/or has a different clock drift relative to the other computers of the plurality (e.g., resulting in different frames having different durations at different times from computer to computer).

Traditionally, the computers are synchronized using hard-wired discrete conductors that are separate from the communication links. When the computers are periodically synchronizing using the discrete conductors, typically at the end of each frame, nominal useful computer processing is suspended. After power-up, it can take several frames to get all of the computers to generate the frames synchronously.

SUMMARY

Disclosed herein are various embodiments of systems, products, and methods for communicating between computers, which may decrease required circuitry, decrease a number of failure modes, improve computation/throughput opportunity, and/or reduce or eliminate a delay of normal computer functionality after power-up.

An embodiment of a method may comprise communicating by a first computer with a second computer over a network during a first frame having a first frame duration. During the first frame, the first computer may transmit a first synchronization signal to the second computer, and the first computer may receive a second synchronization signal from the second computer. The first computer may determine a first elapsed time between a time when the first synchronization signal was transmitted by the first computer and a time when the second synchronization signal was received by the first computer. The first computer may determine a duration for a second frame based at least in part on the first elapsed time.

Another embodiment of a method may comprise communicating by a first computer with a second computer over a network during each frame of a plurality of frames, with each frame having a respective frame duration. During each frame, the first computer may receive from the second computer, over a first discrete communication link separate from the network, a first state indicator signal indicating that the second computer is functional. During each frame, the first computer may transmit to the second computer over the network, a second state indicator signal indicating that the first computer received the first state indicator signal.

An embodiment of a computer system may comprise a processor, a storage device, and a program comprising a plurality of instruction stored in the storage device. The plurality of instructions may be executed by the processor to communicate by a first computer with a second computer over a network during a first frame having a first frame duration. The plurality of instructions may be executed by the processor to transmit a first synchronization signal from the first computer to the second computer during the first frame. Further, the plurality of instructions may be executed by the processor to receive by the first computer during the first frame a second synchronization signal from the second computer. Moreover, the plurality of instructions may be executed by the processor to determine by the first computer a first elapsed time between a time when the first synchronization signal was transmitted by the first computer and a time when the second synchronization signal was received by the first computer. Furthermore, the plurality of instructions may be executed by the processor to determine by the first computer a duration for a second frame based at least in part on the first elapsed time.

An embodiment of a computer program product may comprise at least one computer readable storage medium having computer readable program instructions embodied therewith. The computer readable program instructions, when read by a processor, may be configured to communicate by a first computer with a second computer over a network during a first frame having a first frame duration, and to transmit a first synchronization signal from the first computer to the second computer during the first frame. The computer readable program instructions, when read by a processor, may be further configured to receive by the first computer during the first frame a second synchronization signal received from the second computer. The computer readable program instructions, when read by a processor, may be further configured to determine a first elapsed time between a time when the first synchronization signal was transmitted by the first computer and a time when the second synchronization signal was received by the first computer. The computer readable program instructions, when read by a processor, may be further configured to determine a duration for a second frame based at least in part on the first elapsed time.

The present disclosure provides various systems, products, and methods. In some embodiments, transmitting the first synchronization signal may include transmitting the first synchronization signal at a first predetermined time after initiating the first frame. In some embodiments, the first computer may determine a second predetermined time after initiating the second frame for transmitting a third synchronization signal from the first computer to the second computer. The second predetermined time may be based at least in part on the first elapsed time. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic diagram illustrating a system including a network and a plurality of computers.

FIG. 3 is a schematic diagram illustrating an example of the system of FIG. 1, including a plurality of computers, a network, and a plurality of discrete communication links separate from the network.

FIG. 8 is a flowchart depicting a method, which may be used for indicating that a computer is functional.

FIG. 9 is a schematic diagram showing one implementation of the method of FIG. 8, over the network of FIG. 3 and two of the discrete communication links of FIG. 3.

DESCRIPTION

Overview

Various embodiments of systems, products, and methods are described below and illustrated in the associated drawings. Unless otherwise specified, a system, product or method and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present systems, products and methods may, but are not required to, be included in other similar systems, products and methods. The following description of various embodiments is merely exemplary in nature and is in no way intended to limit the disclosure, its application or uses. Additionally, the advantages provided by the embodiments, as described below, are illustrative in nature and not all embodiments provide the same advantages or the same degree of advantages.

Further, ordinal indicators, such as first, second or third, for identified elements are used to distinguish between the elements, and do not indicate a required or limited number of such elements, and do not indicate a particular position or order of such elements unless otherwise specifically stated. Ordinal indicators may be applied to associated elements in the order in which they are introduced in a given context, and the ordinal indicators for such elements may be different in different contexts.

SPECIFIC EXAMPLES, MAJOR COMPONENTS, AND ALTERNATIVES

The following examples describe selected aspects of exemplary systems, products, and methods. These examples are intended for illustration and should not be interpreted as limiting the scope of the present disclosure. Each example may include one or more distinct embodiments, and/or contextual or related information, functions, and/or structures.

Example 1

Figure 2:
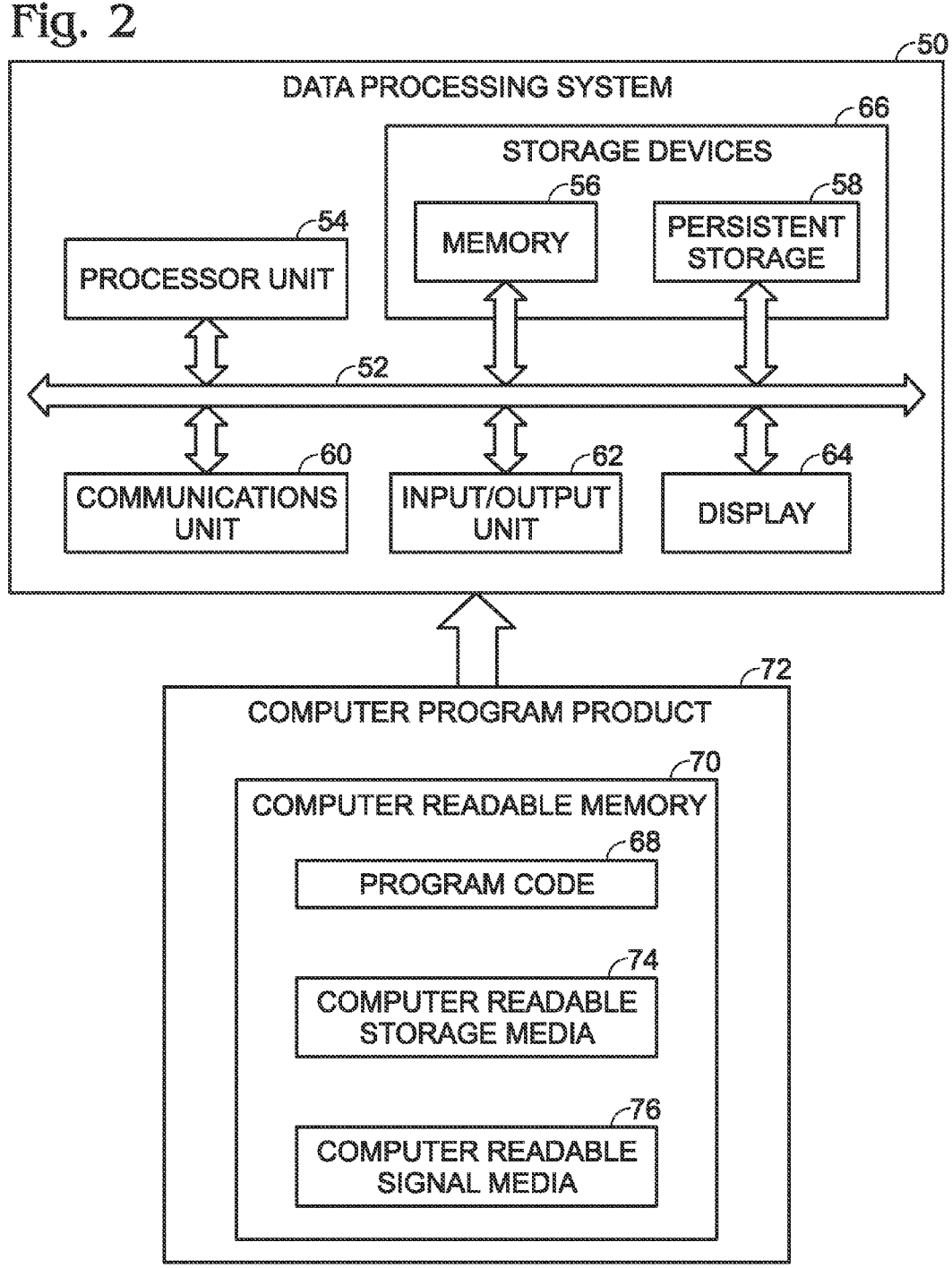
FIG. 2 is a schematic diagram of an illustrative data processing system, which may be an example of one or more of the computers of FIG. 1.

This example describes a system 20 in which illustrative embodiments may be implemented; see FIGS. 1 and 2. It should be appreciated that FIG. 1 is provided as an illustration of one implementation and is not intended to imply any limitation with regard to environments in which different embodiments may be implemented. Many modifications to the depicted environment may be made.

In this example, system 20 may include a network 30. Network 30 may connect together and allow communication between a plurality of data processing systems (or computers), such as between first, second, third, and fourth computers 32, 34, 36, 38. For example, network 30 may include media used to provide one or more connections between computers 32, 34, 36, 38. The one or more connections may be made with wire, wireless communication links, fiber optic cables, and/or any other suitable medium for transmitting and/or communicating data between the plurality of data processing systems.

Exemplary data processing systems of the plurality of processing systems may include, without limitation, one or more redundant computer systems, such as one or more flight control computers (FCCs) or one or more vehicle management system computers (VMSCs), one or more servers, one or more clients of the one or more servers, one or more electronic storage devices, one or more imaging devices, one or more routers, one or more switches, one or more voice gates, one or more servers, and/or one of more networked-enabled tools that may perform a mechanical or other function. These data processing systems may be interconnected through wired, wireless, optical, and other appropriate communication links. The clients may include, without limitation, personal computers, network computers, or smart phones. The imaging devices may include printers, scanners, copiers, facsimile machines, and/or other suitable imaging devices. The servers may provide information, such as boot files, operating system images, and applications to the clients.

Program code located in system 20 may be stored on a computer readable storage medium and downloaded to a data processing system or other device for use, as is discussed in more detail with reference to an exemplary data processing system illustrated in FIG. 2. For example, program code may be stored on a computer readable storage medium of the one or more servers and downloaded to any one of the data processing systems over network 30.

Network 30 may include the Internet or a world-wide connection of networks and gateways that use the Transmission Control Protocol/Internet Protocol (TCP/IP) suite of protocols to communicate with one another. At the heart of the Internet is a backbone of high-speed data communication lines between major nodes of host computers, including commercial, governmental, educational, and other computer systems that route data and messages. Of course, network 30 may be implemented as a number of different networks, such as one or more cross-channel data links (CCDLs), an intranet, a local area network (LAN), or a wide area network (WAN). FIG. 1 is intended as an example, and not as an architectural limitation for the different illustrative embodiments.

FIG. 2 shows an exemplary data processing system 50 in which illustrative embodiments may be implemented. Data processing system 50 is an illustrative data processing system that may be, or may be included in, any one of the plurality of data processing systems described with reference to FIG. 1.

Data processing system 50 may include a communications framework 52. Communications framework 52 may provide communications between a processor unit 54, a memory 56, a persistent storage 58, a communications unit 60, an input/output (I/O) unit 62, and a display 64. In different examples, a network device 104 or an electronic apparatus 106, shown in FIG. 3, may include more or fewer components than those illustrated. Memory 56, persistent storage 58, communications unit 60, input/output (I/O) unit 62, and display 64 are examples of resources accessible by processor unit 54 via communications framework 52.

Processor unit 54 may run instructions for software that may be loaded into memory 56, from a storage device, such as persistent storage 58. Processor unit 54 may be a number of processors, a multi-processor core, or some other type of processor, depending on the particular implementation. Further, processor unit 54 may be implemented using a number of heterogeneous processor systems in which a main processor may be present with secondary processors on a single chip. As another illustrative example, processor unit 54 may be a symmetric multi-processor system containing multiple processors of the same type.

Memory 56 and persistent storage 58 are examples of storage devices 66. A storage device is any piece of hardware that is capable of storing information, such as, for example, without limitation, data, program code in functional form, and other suitable information either on a temporary basis or a permanent basis.

Storage devices 66 also may be referred to as computer readable storage devices in these examples. Memory 56, in these examples, may be, for example, a random access memory or any other suitable volatile or non-volatile storage device. Persistent storage 58 may take various forms, depending on the particular implementation.

For example, persistent storage 58 may contain one or more components or devices. For example, persistent storage 58 may be a hard drive, a flash memory, a rewritable optical disk, a rewritable magnetic tape, or some combination of the above. The media used by persistent storage 58 or the device the storage media is contained in also may be removable. For example, a removable optical disk or removable flash drive may be used for computer readable storage media, or a removable hard drive may be used for persistent storage 58.

Communications unit 60, in these examples, may provide for communications with other data processing systems or devices. In these examples, communications unit 60 may be a network interface card. Communications unit 60 may provide communications through the use of either or both physical and wireless communications links.

Input/output (I/O) unit 62 may allow for input and output of data with other devices that may be connected to data processing system 50. For example, input/output (I/O) unit 62 may provide a connection for user input through a keyboard, a mouse, and/or some other suitable input device. Further, input/output (I/O) unit 62 may send output to a printer. Display 64 may provide a mechanism to display information to a user.

Instructions for the operating system, applications, and/or programs may be located in storage devices 66, which may be in communication with processor unit 54 through communications framework 52. In these illustrative examples, the instructions may be in a functional form on persistent storage 58. These instructions may be loaded into memory 56 for execution by processor unit 54. The processes of the different embodiments may be performed by processor unit 54 using computer-implemented instructions, which may be located in a memory, such as memory 56, or transferred to a memory from a persistent storage device.

These instructions may be referred to as program instructions, program code, computer usable program code, or computer readable program code that may be read and executed by a processor in processor unit 54. The program code in the different embodiments may be embodied on different physical or computer readable storage media, such as memory 56 or media of persistent storage 58.

Program code 68 may be located in a functional form on computer readable media 70 that is selectively removable and may be loaded onto or transferred to data processing system 50 for execution by processor unit 54. Program code 68 and computer readable media 70 may form computer program product 72 in these examples. In one example, computer readable media 70 may be computer readable storage media 74 or computer readable signal media 76.

Computer readable storage media 74 may include, for example, an optical or magnetic disk that is inserted or placed into a drive or other device that is part of persistent storage 58 for transfer onto a storage device, such as a hard drive, that is part of persistent storage 58. Computer readable storage media 74 also may take the form of a persistent storage device containing storage media, such as a hard drive, a thumb drive, or a flash memory, that is connected to data processing system 50. In some instances, computer readable storage media 74 may not be removable from data processing system 50.

In these examples, computer readable storage media 74 may be a physical or tangible storage device used to store program code 68 rather than a medium that propagates or transmits program code 68. Computer readable storage media 74 may be also referred to as a computer readable tangible storage device or a computer readable physical storage device. In other words, computer readable storage media 74 may be a media that can be touched by a person.

Alternatively, program code 68 may be transferred to data processing system 50 using computer readable signal media 76. Computer readable signal media 76 may be, for example, a propagated data signal containing program code 68. For example, computer readable signal media 76 may be an electromagnetic signal, an optical signal, a voltage signal, and/or any other suitable type of signal. These signals may be transmitted over communications links, such as wireless communications links, optical fiber cable, coaxial cable, a wire, and/or any other suitable type of communications link. In other words, the communications link and/or the connection may be a physical structure or wireless in the illustrative examples.

In some illustrative embodiments, program code 68 may be downloaded over a network to persistent storage 58 from another device or data processing system through computer readable signal media 76 for use within data processing system 50. For instance, program code stored in a computer readable storage medium in a server data processing system may be downloaded over a network from the server to data processing system 50. The data processing system providing program code 68 may be a server computer, a client computer, or some other device capable of storing and transmitting program code 68.

The different components illustrated for data processing system 50 are not meant to provide architectural limitations to the manner in which different embodiments may be implemented. The different illustrative embodiments may be implemented in a data processing system including components in addition to and/or in place of those illustrated for data processing system 50. Other components shown in FIG.

2 can be varied from the illustrative examples shown. The different embodiments may be implemented using any hardware device or system capable of running program code. As one example, data processing system 50 may include organic components integrated with inorganic components and/or may be comprised entirely of organic components excluding a human being. For example, a storage device may be comprised of an organic semiconductor.

In another illustrative example, processor unit 54 may take the form of a hardware unit that has circuits that are manufactured or configured for a particular use, such as firmware. This type of hardware may perform operations without needing program code to be loaded into a memory from a storage device to be configured to perform the operations.

For example, when processor unit 54 takes the form of a hardware unit, processor unit 54 may be a circuit system, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 68 may be omitted, because the processes for the different embodiments may be implemented in a hardware unit.

In still another illustrative example, processor unit 54 may be implemented using a combination of processors found in computers and hardware units. Processor unit 54 may have a number of hardware units and a number of processors that are configured to run program code 68. With this depicted example, some of the processes may be implemented in the number of hardware units, while other processes may be implemented in the number of processors.

In another example, a bus system may be used to implement communications framework 52 and may be comprised of one or more buses, such as a system bus or an input/output bus. Of course, the bus system may be implemented using any suitable type of architecture that provides for a transfer of data between different components or devices attached to the bus system.

Additionally, communications unit 60 may include a number of devices that transmit data, receive data, or both transmit and receive data. Communications unit 60 may be, for example, a modem or a network adapter, two network adapters, or some combination thereof. Further, a memory may be, for example, memory 56, or a cache, such as that found in an interface and memory controller hub that may be present in communications framework 52.

Example 2

Figure 4:
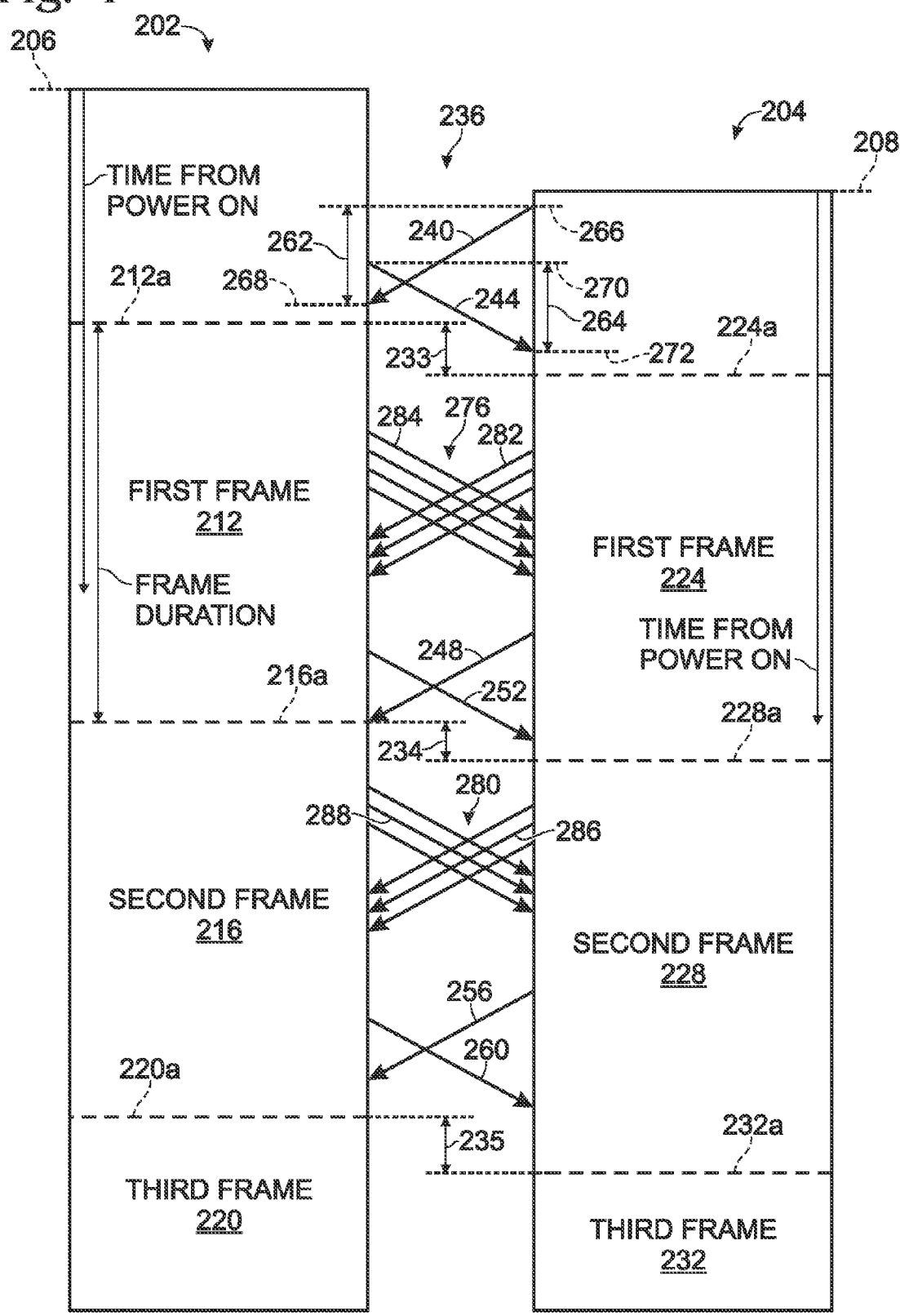
FIG. 4 is a schematic diagram illustrating communication over the network of FIG. 3, during a plurality of frames, between two of the computers of FIG. 3.

This example describes a system 100, in which illustrative embodiments may be implemented; see FIGS. 3 and 4. System 100 is an embodiment of system 20 of FIG. 1. It should be appreciated that FIGS. 3 and 4 are provided as an illustration of one implementation and are not intended to imply any limitation with regard to environments in which different embodiments may be implemented. Many modifications to the depicted environment may be made.

Referring to FIG. 3, system 100 may include a plurality of computers, such as first, second, and third computers 102, 104, 106. System 100 may include a network 108. Network 108 may include one or more CCDLs, such as first, second, and third CCDLs 110, 112, 114. The CCDLs may be or may include one or more IEEE 1394 interfaces, Ethernet interfaces, RS-422 lines, any other suitable communication link, or a suitable combination thereof.

The plurality of computers may communicate with one another over network 108. For example, computers 102, 104 may be connected by and may communicate over CCDL 110. Similarly, computers 104, 106 may be connected by and may communicate over CCDL 112, and computers 106, 102 may be connected by and may communicate over CCDL 114.

System 100 may include one or more discrete communication links 116, such as first, second, and third discrete communication links 118, 120, 122. Links 116 may be dedicated data channels that are separate from one another. Links 116 may enable transmission and reception of state indictor signals, such as a hi signal or a low signal, between the computers indicating that an associated computer is functional. For example, computer 102 may be configured to transmit a state indicator signal indicating that computer 102 is functional over (or via) link 118 to computers 104, 106. Similarly, computer 104 may be configured to transmit a state indicator signal indicating that computer 104 is functional over link 120 to computers 102, 106, and computer 106 may be configured to transmit a state indicator signal indicating that computer 106 is functional over link 122 to computers 102, 104.

Links 116 may be separate from network 108. For example, link 118 may be a first conductive element, such as a first copper wire, connecting a state indicator signal output of computer 102 to respective state indicator signal inputs of computers 104, 106. Similarly, link 120 may be a second conductive element, such as a second copper wire, connecting a state indicator signal output of computer 104 to respective state indicator signal inputs of computers 102, 106, and link 122 may be a third conductive element, such as a third copper wire, connecting a state indicator signal output of computer 106 to respective state indicator signal inputs of computers 102, 104.

Computers 102, 104, 106 may be configured to control and/or monitor one or more components 123. For example, first, second, and third communication links 126, 128, 130 may connect respective computers 102, 104, 106 to a component 124 of components 123.

System 100 and/or components 123 may be included in a single device or object 132. For example, object 132 may be a vehicle, such as an airplane or a boat, component 124 may be an operative component of the vehicle, such as a flap on a wing of the airplane or a rudder of the boat, in which case, computers 102, 104, 106 may be FCCs or VMSCs for controlling and/or monitoring component 124, and/or backing-up any one of the other of computers in case of computer failure or communication-link failure.

FIG. 4 depicts a schematic timeline illustrating representative communication between two computers, such as computers 102, 104 over CCDL 110, with a processing timeline 202 for computer 102 on the left-hand side of FIG. 4, and with a processing timeline 204 for computer 104 on the right-hand side of FIG. 4. In FIG. 4, time progresses from the top of the view to the bottom of the view. Though not shown here, computers 102, 106 and computers 104, 106 may communicate (and/or interact) with one another in a manner similar to computers 102, 104 described below and shown in FIG. 4.

As indicated in FIG. 4, computers 102, 104 may power-on at different times. For example, computer 102 may power-on at a time 206, and computer 104 may power-on at a (later) time 208. Time 206 is shown occurring prior to time 208, however, in some examples, computer 104 may power-on prior to computer 102. In other examples, computers 102, 104 may power-on substantially simultaneously.

Each computer may divide its respective execution (or processing) into one or more sequential frames. In this example, execution of computer 102 occurs during representative first, second, third sequential frames 212, 216, 220, and execution of computer 104 occurs during first, second, third sequential frames 224, 228, 232.

The frames may have predetermined frame durations and/or a predetermined frequency. For example, the frames may nominally be 10 milliseconds in duration, resulting in a frame frequency of 100 Hz. However, corresponding frames may be or become out of sync with one another due to the computers 102, 104 being powered-on at different times, and/or having different operating characteristics, such as possible variations between drift rates of respective clocks of the respective computers. For example, because computers 102, 104 may have been powered-on at different times and/or because a drift rate of a clock of computer 102 may be different than a drift rate of a clock of computer 104 in respective times from power-on of those respective computers, corresponding first frames 212, 224 may have respective start times 212a, 224a that are out of sync with one another by a duration 233, corresponding second frames 216, 228 may have respective start times 216a, 228a that are out of sync with one another by a duration 234, and/or corresponding third frames 220, 232 may have respective start times 220a, 232a that are out of sync with one another by a duration 235.

Such asynchronicity between corresponding frames may reduce an opportunity for processing by respective computers 102, 104 during the respective corresponding frames, and/or reduce the time available for sharing data between computers 102, 104 via CCDL 110.

Pre-existing systems typically sought to reduce such asynchronicity by hard-wiring additional discrete communication links between computers of the system, and manipulating these additional links to indicate when the respective computers have reached respective times near respective ends of their respectively corresponding frames. For example, first and second computers of these pre-existing systems may each start respective corresponding first frames. The first computer may begin periodic execution of frame modules in the first frame of the first computer during which the first computer communicates with the second computer, and may process data until a time near an end of the first frame of the first computer. At such time the first computer disables its interrupts and indicates to the second computer that the first computer has reached the time near the end of the first frame of the first computer. For example, the first computer may apply a voltage to one of the additional links to indicate (or assert) to the second computer that the first computer has reached the time near the end of the first frame of the first computer. Similarly, the second computer may begin periodic execution of frame modules in the first frame of the second computer, and may process data until a time near an end of the first frame of the second computer, at which time the second computer may disable its interrupts and indicate (assert) to the first computer that the second computer has reached the time near the end of the first frame of the second computer by applying a voltage to one of the other additional links.

In these pre-existing systems, the first and second computers generally do nothing except wait (e.g., do not process data) until the respective computer has determined that a predetermined duration of time has elapsed since the respective computer asserted the respective voltage or until the other of the first and second computers has asserted and then de-asserted its status by applying a corresponding voltage on the associated link. Typically, a computer enables interrupts and starts a subsequent frame only after the computer has either waited until the predetermined duration of time has lapsed, or until one of the other computers de-asserts its status by changing the voltage applied to the associated discrete communication link. This disabling of interrupts and doing nothing but waiting generally results in a loss of processing time and throughput, as well as a loss of opportunity for sharing data between the computers.

In contrast, embodiments of the present disclosure may increase processing time, throughput, and/or opportunity for sharing data by synchronizing the respective frames of the respective computers through communications, generally indicated at 236, over CCDL 110. For example, communications 236 may include a plurality of CCDL messages, a subset of which, such as CCDL messages 240, 244, 248, 252, 256, and 260, may be used for frame synchronization to decrease one or more of durations 233, 234, 235.

In particular, transit times for respective messages, such as a transit time 262 of message 240 and a transmit time 264 of message 244, between computers 102, 104 over CCDL 110 may have a known or predetermined relationship (e.g., may be generally equal to one another), and as such, information associated with the messages may be used to synchronize subsequent frames. For example, information associated with messages 240, 244 may be included in messages 248, 252 and used to substantially synchronize corresponding second frames 216, 228. Similarly, information associated with messages 248, 252 may be included in messages 256, 260 and used to substantially synchronize corresponding third frames 220, 232.

As shown in FIG. 4, transit time 262 may be defined as an elapsed time between a time 266 when message 240 was transmitted by computer 104 and a time 268 when message 240 was received by computer 102. Similarly, transit time 264 may be defined as an elapsed time between a time 270 when message 244 was transmitted from computer 102 and a time 272 when message 244 was received by computer 104. Transit times 262 and 264 may be substantially the same.

In some embodiments, the system may determine a first elapsed time between times 266, 272 (or between other similar times, such as a time of transmission of a message from one computer to another computer and a time of reception of a message by the one computer from the other computer). Based at least in part on the first elapsed time, the system may determine a duration for a subsequent frame, examples of which are further described with reference to FIGS. 5-7.

Communications 236 may include other messages transmitted between computers 102, 104. For example, communications 236 may include a plurality of messages 276 transmitted between computers 102, 104 during corresponding frames 212, 214, and a plurality of messages 280 transmitted between computers 102, 104 during corresponding frames 216, 228. As shown, messages 276 may include one or more messages 282 transmitted from computer 104 and received by computer 102, and one or more messages 284 transmitted from computer 102 and received by computer 104. Similarly, messages 280 may include one or more messages 286 transmitted from computer 104 and received by computer 102, and one or more messages 288 transmitted from computer 102 and received by computer 104.

Messages 282, 286 may include data associated with the processing of computer 104, such as an operational status of computer 104 and/or data related to control and/or monitoring by computer 104 of component 124 or a first subcomponent of component 124. Similarly, messages 284, 288 may include data associated with the processing of computer 102, such as an operational status of computer 102 and/or data related to control and/or monitoring by computer 102 of a second subcomponent of component 124.

Reception of messages 284, 288 by computer 104 may enable computer 104 to take over (or supplement) control and/or monitoring of the first subcomponent. For example, if link 126 becomes dysfunctional (e.g., breaks due to operational stress) or if the operational status of computer 102 indicates that computer 102 is no longer functional (e.g., for controlling and/or monitoring the first subcomponent, in which case computer 102 may be restarted). Similarly, reception of messages 282, 286 by computer 102 may enable computer 102 to take over (or supplement) control and/or monitoring of the second subcomponent, for example, if link 128 becomes dysfunctional or if the operational status of computer 104 indicates that computer 104 is no longer functional.

Pre-existing systems typically indicated the operational status of computers to one another by continuously asserting respective signals on respective dedicated data channels, such as discrete communication links 116 (see FIG. 3), that are separate from a network over which the computers communicated. However, if one computer of the system stopped receiving a signal over one of the dedicated data channels from a particular computer, the one computer generally could not determine whether the dedicated data channel was no longer functional or whether the particular computer was no longer functional.

In contrast, embodiments of the present disclosure may transmit one or more state indicator signals over links 116 to indicate that the associated computers are functional, and may transmit one or more state indicator signal over network 108 to indicate that the respective computers received the state indicator signals over links 116 from the associated computers, examples of which are described in more detail with reference to FIGS. 8-11. By transmitting indicator signals over both network 108 and links 116, computers of the system may be able to differentiate a change in functionality of a particular computer, from a change in functionality of a particular CCDL, and/or from a change in functionality of a particular discrete communication link, which may improve the allocation of processing functions within the system.

Example 3

Figure 5:
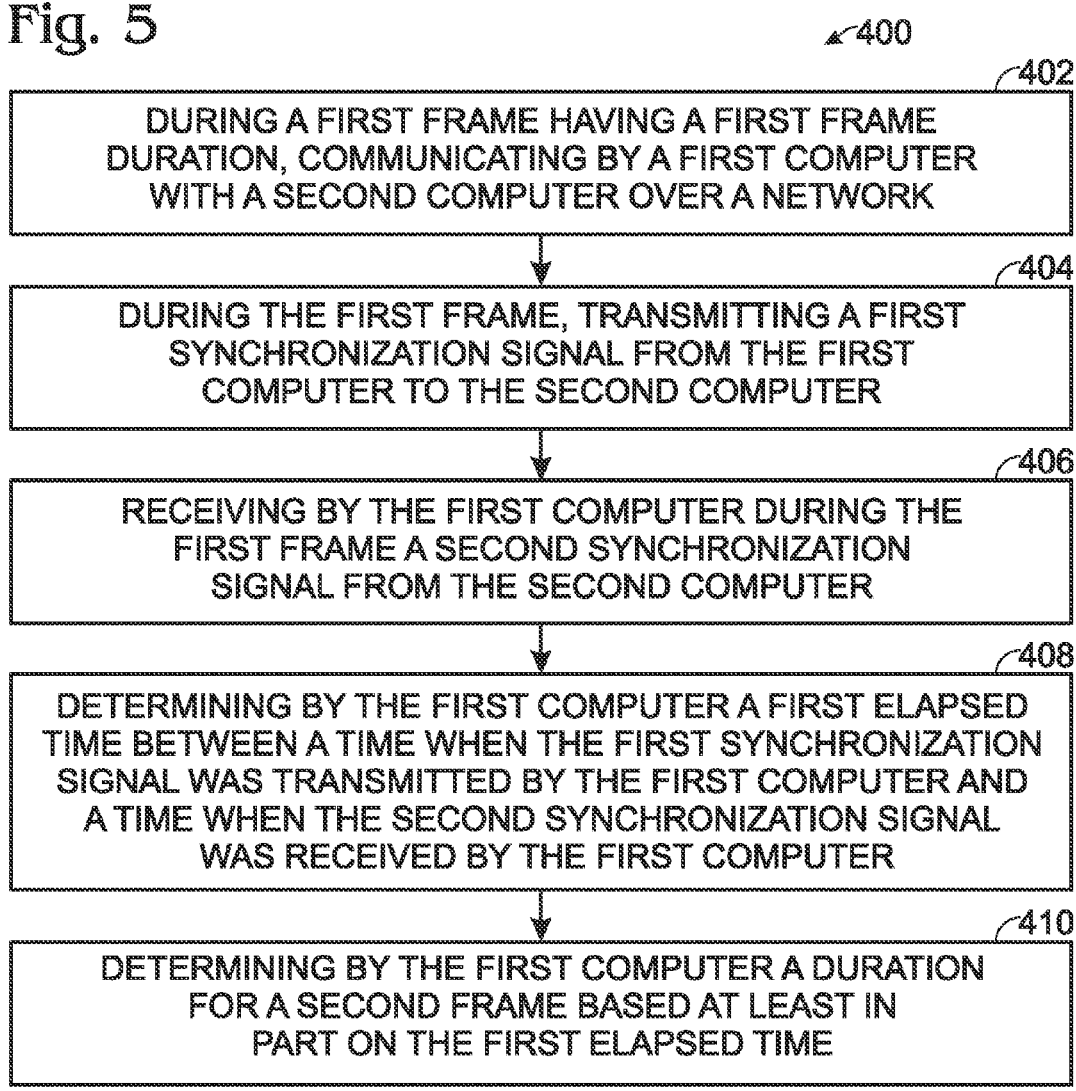
FIG. 5 is a flowchart depicting a method, which may be used to synchronize the frames of FIG. 4.
Figure 6:
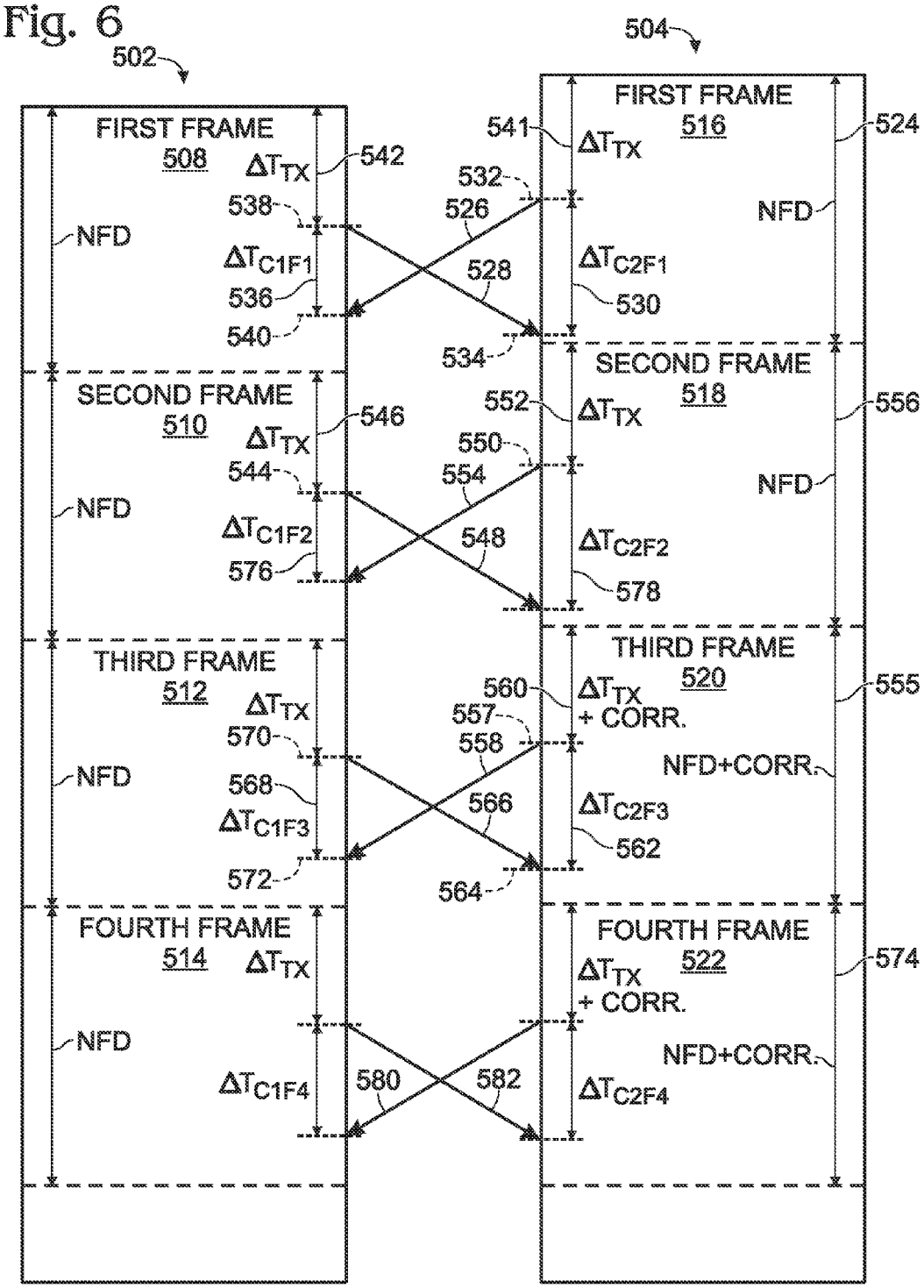
FIG. 6 is a schematic diagram illustrating an implementation of the method of FIG. 5.
Figure 7:
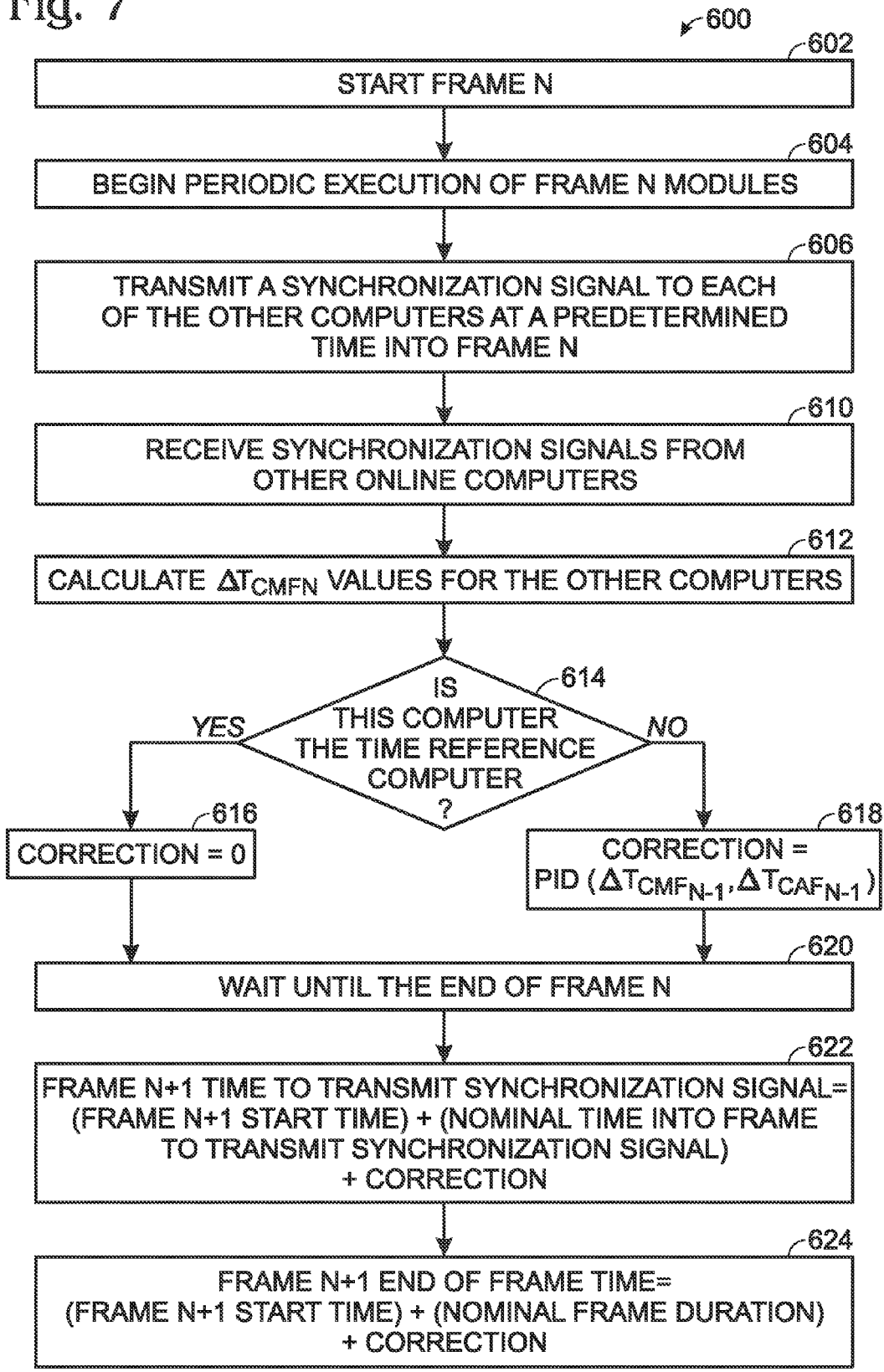
FIG. 7 is a flowchart depicting a method performed by an embodiment.

This example describes various methods, which may be used for frame synchronization; see FIGS. 5-7.

FIG. 5 is a flowchart illustrating steps performed in an illustrative method. More specifically, FIG. 5 depicts multiple steps of a method, generally indicated at 400, which may be performed in conjunction with either of systems 20 or 100 according to aspects of the present disclosure. For example, an implementation of method 400 in conjunction with system 100 is depicted in FIG. 6. Although various steps of method 400 are described below and depicted in FIG. 5, the steps need not necessarily all be performed, and in some cases may be performed in a different order than the order shown.

Method 400 may include a step 402 of communicating by a first computer with a second computer over a network during a first frame having a first frame duration. For example, FIG. 6 depicts a schematic timeline of computers 102, 104 communicating with one another, in a manner similar to the schematic timeline of FIG. 4, but with method 400 implemented to synchronize frame durations of computer 104 with frame durations of computer 102. In particular, a schematic processing timeline 502 of computer 102 is depicted on a left-hand side of FIG. 6, a schematic processing timeline 504 of computer 104 is depicted on a right-hand side of FIG. 6, and communications between computers 102, 104 are schematically depicted in a central portion of FIG. 6. It should be appreciated that FIG. 6 is not a precise time diagram, but rather is intended to illustrate frame synchronization, as will be described below. For example, even if not illustrated precisely in FIG. 6, transit times of CCDL messages between the computers may be generally equal to one another.

As shown in FIG. 6, computer 102 may have a sequence of frames including first, second, third, and fourth frames 508, 510, 512, 514. Similarly, computer 104 may have a sequence of frames including first, second, third, and fourth frames 516, 518, 520, 522. Similar to FIG. 4, time may progress from top to bottom in FIG. 6, and though not shown here, computers 102, 106 and computers 104, 106 may communicate with one another in a manner similar to that of computers 102, 104, as described below. In this example, computer 102 may be considered a reference computer that does not vary the frame duration. Computers 104 and 106 may both vary the frame durations they use based on the timing of the synchronization signals that are communicated and/or the timing information that they determine.

Computer 104 may be the first computer of method 400, and computer 102 may be the second computer of method 400. For example, step 402 may involve communicating by computer 104 with computer 102 over network 108 (e.g., over CCDL 100) during frame 518 having a frame duration 524, as shown in FIG. 6.

Method 400 may include a step 404 of transmitting a first synchronization signal from the first computer to the second computer during the first frame. For example, at step 404, during frame 516, computer 104 may transmit a synchronization signal 526 to computer 102, as shown in FIG. 6. Signal 526, and any of the other synchronization signals described below, may be or may include a CCDL message transmitted over an associated CCDL (e.g., CCDL 110), such as any one of messages 240, 248, 256, 282, 286 of FIG. 4.

Method 400 may include a step 406 of receiving by the first computer during the first frame a second synchronization signal received from the second computer. For example, at step 406, computer 104 may receive a synchronization signal 528 from computer 102 over CCDL 110.

Method 400 may include a step 408 of determining by the first computer a first elapsed time between a time when the first synchronization signal was transmitted by the first computer and a time when the second synchronization signal was received by the first computer. For example, at step 408, computer 104 may determine a first elapsed time 530 between a time 532 when signal 526 was transmitted by computer 104 and a time 534 when signal 528 was received by computer 104. Similarly, computer 102 may determine an elapsed time 536 between a time 538 when signal 528 was transmitted and a time 540 when signal 526 was received. Elapsed time 530 is indicated in FIG. 6 as $\Delta T_{C2F1}$, where subscript C2 denotes computer 104, and subscript F1 denotes first frame 516 of computer 104. Similarly, elapsed time 536 is indicated in FIG. 6 as $\Delta T_{C1F1}$, where subscript C1 denotes computer 102, and subscript F1 denotes first frame 508 of computer 102. Other elapsed times are indicated in FIG. 6 in a similar fashion, with $\Delta T_{C(M)F(N)}$ indicating the elapsed time between transmission of a synchronization signal by computer M during frame N of computer M to another computer and reception of a synchronization signal by computer M from that other computer during frame N of computer M.

Time 532 may be a predetermined time after initiation of frame 516, and time 538 may be a predetermined time after initiation of frame 508. Specifically, computer 104 may be configured to transmit signal 526 after a predetermined duration 541 (e.g., $\Delta T_{TX}$) of time has lapsed in frame 516, and computer 102 may be configured to transmit signal 528 after a predetermined duration 542 (e.g., $\Delta T_{TX}$) of time has lapsed in frame 508, which may enable the system to determine (or adjust) a duration of one or more subsequent frames based at least in part on one or more of elapsed times 530, 536.

For example, method 400 may include a step 410 of determining by the first computer a duration for a second frame based at least in part on the first elapsed time. For example, at step 410, computer 104 may determine the duration for the second frame based at least in part on elapsed time 530. In FIG. 6, third frame 520 of computer 104 may be the second frame of step 410. For example, method 400 may include a step of receiving data indicating elapsed time 536 by computer 104 from computer 102. In particular, at a predetermined time 544 after initiation of frame 510 (e.g., after a predetermined duration 546, such as $\Delta T_{TX}$, has elapsed in frame 510), computer 102 may transmit a synchronization signal 548 over CCDL 110 to computer 104. Signal 548 may include elapsed time 536, such as $\Delta T_{C1F1}$ (or data representative thereof, and/or other information associated with signals 526, 528). Similarly, at a predetermined time 550 after initiation of frame 518 (e.g., after a predetermined duration 552, such as $\Delta T_{TX}$, has lapsed in frame 518), computer 104 may transmit a synchronization signal 554 over CCDL 110 to computer 102. Signal 554 may include elapsed time 530, such as $\Delta T_{C2F1}$ (or data representative thereof, and/or other information associated with signals 526, 528).

Computer 104 may compare elapsed time 530 to elapsed time 536 that computer 104 received from computer 102 via signal 548. For example, computer 104 may compare elapsed times 530, 536 and determine that elapsed time 530 is greater than elapsed time 536. Computer 104 may determine a duration 555 for frame 520 based at least in part on the comparison of elapsed time 530 to elapsed time 536. For example, computer 104 may adjust (e.g., add to) a nominal frame duration (NFD) of frame 520 (e.g., which may be equal to duration 524 of frame 516, and/or a duration 556 of frame 518) by a frame duration correction, abbreviated as "CORR" in frame 520 of FIG. 6. In one embodiment, computer 104 may increase the nominal frame duration of frame 520 by a frame duration correction corresponding to a difference of elapsed times 530, 536 divided by two (e.g., [elapsed time 530–elapsed time 536]/2) when determining duration 555. However, in some embodiments the frame duration correction may be determined using a Proportional Integral Derivative (PID) control loop or other form of frame duration regulation that incorporates information from a plurality of prior frames, which may improve a feedback behavior of the system.

In some embodiments, method 400 may include a step of determining by computer 104 a predetermined time 557 for transmitting a synchronization signal 558 from computer 104 to computer 102 based at least in part on elapsed time 530. For example, computer 104 may determine a duration 560 (e.g., $\Delta T_{TX}$+the duration correction for frame 520) between initiation of frame 520 (e.g., an initiation or starting time of frame 520) and a time at which signal 558 is transmitted by adding the frame duration correction (or a duration that is substantially equivalent thereto) to a nominal (or base) predetermined period of time after initiation of frame 520, which may be equal or substantially equal to either of durations 541, 552.

The system (e.g., computer 104, or computer 102 if computer 102 receives sufficient information associated with the corresponding signals) may be configured to determine an elapsed time 562 (e.g., $\Delta T_{C2F3}$) between time 557 and a time 564 when a synchronization signal 566 was received by computer 104 from computer 102.

Similarly, the system (e.g., computer 102, or computer 104 if computer 104 receives sufficient information associated with the corresponding signals) may be configured to determine an elapsed time 568 (e.g., $\Delta T_{C1F3}$) between a time 570 when computer 102 transmitted signal 566 to computer 104 and a time 572 when computer 102 received signal 558 from computer 104.

As a result of the adjustments to the duration of the predetermined time for transmitting signal 558, elapsed times 562, 568 may be closer in value to (or equal to, or substantially equal to) one another by determining time 557 based at least in part on elapsed time 530, and particularly on a comparison of elapsed times 530, 536. The difference in durations 562, 568 may indicate the variance in frame timing for the two computers. As a result of the frame-time corrections, durations 562, 568 may have respective values that are closer to one another than durations 530, 536 are to one another. Similarly, by determining frame duration 555 based at least in part on elapsed time 530, the start times of frames 514, 522 and their respective durations may be more closely synchronized.

In some embodiments of method 400, determining by the first computer a duration for a second frame may include determining by the first computer the duration for the second frame based at least in part on comparisons of respective elapsed times for each of a plurality of frames occurring prior to the second frame. Each respective elapsed time may be a time between transmitting a corresponding synchronization signal from one of the first and second computers to the other of the first and second computers and receiving a corresponding synchronization signal from the other of the first and second computers by (or to) the one of the first and second computers. For example, the second frame of step 410 may be frame 522 in FIG. 6, in which case computer 104 may determine a duration 574 for frame 522 based at least in part on a comparison of elapsed times 530, 536, on a comparison of elapsed times 576, 578, and/or on a comparison of elapsed times 562, 568. Computer 104 may calculate a frame duration correction (abbreviated as "CORR" in frame 522) for frame 522 by inputting these elapsed times (or comparisons thereof) into the PID control loop. However, in some embodiments computer 104 may determine (or calculate) the frame duration correction for frame 522 by calculating a difference between elapsed times 562, 568, and dividing this difference by two (2). Similarly, a time at which a synchronization signal 580 is transmitted from computer 104 to computer 102 in frame 522 may be adjusted by the frame duration correction of frame 522, such as at an elapsed time into frame 522 that is equivalent or substantially equal to $\Delta T_{TX}$ plus the frame duration correction for frame 522, as shown.

As shown in FIG. 6, elapsed time 576 (e.g., $\Delta T_{C1F2}$) may be a time between transmitting signal 548 from computer 102 to computer 104 and receiving signal 554 from computer 104 by computer 102. Elapsed time 578 (e.g., $\Delta T_{C2F2}$) may be a time between transmitting signal 554 from computer 104 to computer 102 and receiving signal 548 from computer 102 by computer 104.

Signals 526, 528 may correspond with one another, signals 548, 554 may correspond with one another, signals 558, 566 may correspond with one another, and signals 580, 582 may correspond with one another. Signal 558 may include elapsed time 578, such as $\Delta T_{C2F2}$, (or data representative thereof, other information associated with signals 548, 554, and/or any other information associated with any previous synchronization signals). Signal 566 may include elapsed time 576, such as $\Delta T_{C1F2}$, (or data representative thereof, other information associated with signals 548, 554, and/or any other information associated with any previous synchronization signals). Signal 580 may include elapsed time 562 (or data representative thereof, other information associated with signals 558, 566, and/or any other information associated with any previous synchronization signals). Signal 582 may include elapsed time 568 (or data representative thereof, other information associated with signals 558, 566, and/or any other information associated with any previous synchronization signals). Similarly, during corresponding or associated fifth frames, a synchronization signal transmitted by computer 104 to computer 102 may include information representative of $\Delta T_{C2F4}$ (or any other previous elapsed time), and a synchronization signal transmitted by computer 102 to computer 104 may include information representative of $\Delta T_{C1F4}$ (or any other previous elapsed time), either of which may be used to synchronize subsequent frames.

As mentioned above, computers 102, 106 and computers 104, 106 may communicate with one another in a manner similar to computers 102, 104. For example, method 400 may include transmitting a third synchronization signal from computer 104 to computer 106 over CCDL 112 during frame 516, and receiving a fourth synchronization signal by computer 104 from computer 106 during frame 516. Computer 104 may determine an elapsed time between a time when the third synchronization signal was transmitted by computer 104 and a time when the fourth synchronization signal was received by computer 104, in which case step 410 may include determining by computer 104 the duration for the second frame based also at least in part on the determined elapsed time between the time when the third synchronization signal was transmitted by computer 104 and the time when the fourth synchronization signal was received by computer 104.

In some embodiments, method 400 may include a step of, during each of a plurality of frames including the first frame, receiving by the first computer from the second computer over a first discrete communication link separate from the network a first state indicator signal indicating that the second computer is functional. For example, during each of frames 516, 518, 520, 522, computer 104 may receive from computer 102 over link 118 (see FIG. 3) the first state indicator signal, which may indicate that computer 102 is functional.

Method 400 may include a step of, during each frame of the plurality of frames, transmitting by the first computer to the second computer over the network, a second state indicator signal indicating that the first computer received the first state indicator signal. For example, during each of frames 516, 518, 520, 522, computer 104 may transmit the second indicator signal over CCDL 110, which may indicate that computer 104 received the first state indicator signal, and may assist in verifying system functionality and/or determining a potential remedy if the system happens to encounter a problem, an example of which is described further below in relation to FIGS. 8-11. For example, computer 102 may be configured to verify that link 118 is operational based on reception of the second state indictor signal from computer 104, and/or may be configured to identify that link 118 has become dysfunctional if computer 102 did not receive the second state indicator signal from computer 104 in response to the first state indicator signal from computer 102.

In some embodiments of method 400, the first computer may transmit to the second computer over the network a second state indicator signal that indicates that the first computer is functional. For example, the second state indicator signal transmitted from computer 104 to computer 102 over CCDL 110 may also indicate that computer 104 is functional in addition to indicating that computer 104 received the first state indicator signal from computer 102.

In some embodiments, method 400 may include a step of, during each frame, transmitting by the first computer to the second computer over a second discrete communication link separate from the network and the first discrete communication link, a third state indicator signal also indicating that the first computer is functional. For example, during each of frames 516, 518, 520, 522, computer 104 may transmit the third state indicator signal over link 120 to computer 102. The third state indicator signal may indicate that computer 104 is functional.

Similarly, computer 106 may be configured to transmit and/or receive analogous signals to and from computers 102, 104 over network 108 and/or links 116. The method (or feedback process) described above, or any portion thereof, may not occur every frame. For example, information, such as corresponding synchronization signals and/or state indicator signals, could be exchanged every other frame, every third frame, or every $n^{th}$ frame. Further, if the system is less sensitive to synchronization (e.g., more tolerable to frame start times being out of sync with one another), or if the system is relatively stable (e.g., once frames are brought into synchronization, subsequent frames generally remain synchronized), information could be exchanged on an even less frequent basis, such as only when one of the computers powers-on or is restarted.

FIG. 7 is a flowchart illustrating operations performed by one embodiment. Other embodiments may have more or fewer steps or different steps. FIG. 7 depicts multiple steps of a method, generally indicated at 600, which may be performed in conjunction with either of systems 20 or 100. Although various steps of method 600 are described below and depicted in FIG. 7, the steps need not necessarily all be performed, and in some cases may be performed in a different order than the order shown.

Method 600 may be performed on one or more computers of a plurality of computers of the system, and/or during each frame of execution of the one or more computers. In FIG. 7, N may be a designation for a current processing frame. M may be a designation for "this computer" (e.g., a computer, or the respective computer, that is currently performing the steps of method 600, for example, in a current loop of method 600). A time reference computer may be a computer of the plurality of computers having frames to which the other computers of the plurality of computers synchronize their respective frames. For example, in FIG. 6, computer 102 (as depicted on the left-hand side of FIG. 6) may be the reference computer, as computer 104 is shown (as depicted on the right-hand side of FIG. 6) synchronizing its frames 520, 522 to frames 512, 514 of computer 102.

Method 600 may include a step 602 of starting frame N, and a step 604 of beginning periodic execution of frame N computation modules. For example, at step 602, if computer 104 is computer M, then computer 104 may initiate frame 518 (see FIG. 6), and at step 604, computer 104 may transmit CCDL messages (similar to messages 286—see FIG. 4) during duration 552 to computer 102 and/or computer 106.

Method 600 may include a step 606 of transmitting a synchronization signal to each of the other computers at a predetermined time into frame N. For example, at step 606, computer 104 may transmit synchronization signal 554 (see FIG. 6) to computer 102, and may transmit another synchronization signal to computer 106 over CCDL 114 (see FIG. 3). The synchronization signals may contain values corresponding to respective elapsed times between transmission of a synchronization signal from computer M and reception by computer M of respective synchronization signals from the other respective computers in a previous frame (e.g., frame N−1). Stated another way, the respective synchronization signals may contain $\Delta T_{C(\#)F(N-1)}$ values for all other computers, where C(#) indicates computer # and F(N−1) indicates frame N−1. In some embodiments, computer 104, or another computer M, may transmit the respective synchronization signals to the respective other computers at different predetermined times into Frame N. In some embodiments, the synchronization signals may be included in CCDL messages that also include data related to control and/or monitoring of components 123 (see FIG. 3).

Method 600 may include a step 610 of receiving synchronization signals from other online computers. At step 610, the received synchronization signals may contain $\Delta T_{C*\#)F(N-1)}$ as measured by each of the other (online) respective computers of the plurality of computers, where # may designate the computer from which the respective synchronization signal was received. For example, at step 610, if computer M is computer 104, computer # is computer 102, and if N=2, then $\Delta T_{C(\#)F(N-1)}$ may be represented as $\Delta T_{C(102)F(1)}$ and equal to duration 536 (see FIG. 6). Similarly, at step 610, computer 104 may receive a $\Delta T_{C(106)F(N-1)}$ value from computer 106 corresponding to an elapsed time between transmission of a synchronization signal from computer 106 to computer 104 in the frame N−1, and reception of a synchronization signal by computer 106 from computer 104 in the frame N−1.

In some embodiments, the system may be configured to allow one or more of the computers of the plurality of computers to receive a synchronization signal from one or more of the other computers (or partner computers) of the plurality of computers in the frame N−1. For example, each computer may be configured to proceed to frame N+1 even though that particular computer may have not yet received a synchronization signal from one or more of the other computers. In such a case, one or more of the other computers may have been configured to delay synchronization signal transmission (e.g., to complete local processing), and to include in the delayed synchronization signal information representative of how much that particular signal has been delayed, which may allow the particular computer to determine a frame duration correction despite the delay.

Method 600 may include a step of calculating $\Delta T_{C(\#)F(N)}$ for (or associated with) the other computers of the plurality of computers. For example, when computer M is computer 104 and N=2, then at step 612, computer 104 may calculate a $\Delta T_{C(M)F(N)}$ value for computer 102 that is equal to duration 578 (see FIG. 6), and computer 104 may similarly calculate a $\Delta T_{C(M)F(N)}$ value for computer 106 that is equal to corresponding transmission and reception times of respective synchronization signals, assuming computer 106 is online (e.g., active and in communication with computer 104) during frames corresponding to frames 516, 518.

Method 600 may include a step 614 of determining whether computer M (or "this computer") is the reference computer. The system may predetermine what computer is the reference computer, such as designating one as a default reference computer, or other algorithms may be used to select one of the computers as a reference computer. In some embodiments none of the computers is a reference computer, and each computer adjusts its frame times (or frame durations) relative to the other computers.

If it is determined at step 614 that computer M is the reference computer, then method 600 may proceed to a step 616 of setting a frame duration correction for frame N of computer M equal to zero. However, if it is determined at step 614 that computer M is not the reference computer, then method 600 may proceed to a step 618 of setting a frame duration correction for computer M equal to a PID control loop calculated value using $\Delta T_{C(M)F(N-1)}$, $\Delta T_{C(A)F(N-1)}$ as the current frame inputs, where A designates the reference computer, as mentioned above. The frame duration correction calculated at step 618 may be applied to frame N, or any other suitable subsequent frame.

Both of steps 616, 618 may proceed to a step 620 during which computer M waits until the end of frame N. Although computer M may be "waiting" at step 620, computer M may also simultaneously be processing data, transmitting CCDL messages to other computers via network 108, and/or receiving CCDL messages from other computers via network 108. Thus, the synchronization process is integrated with other data processing. This may improve throughput and sharing of information in system 100 compared to pre-existing systems which generally prevent such actions near an end of a frame due to these pre-existing systems being dependent on synchronization signals communicated via dedicated communication channels (or discretes), as mentioned above.

Method 600 may include a step 622 of setting a frame N−1 time to transmit a synchronization signal from computer M (e.g., a predetermined time into frame N+1 when computer M will transmit a synchronization signal to the other computers) equal to a frame N−1 start time plus a nominal time into frame N−1 to transmit the synchronization signal (e.g., the nominal transmission duration) plus the frame duration correction calculated in step 618.

Method 600 also may include a step 624 of setting a frame N−1 end frame time equal to the frame N−1 start time plus a nominal frame time (e.g., the nominal frame duration) plus the correction calculated at step 618. After step 624, method 600 may return to step 602 and be repeated for frames N−1, N+2, etc., to dynamically synchronize those frames with one another as well.

Example 4

This example describes various methods, which may be used for indicating computer functionality; see FIGS. 8-11.

FIG. 8 is a flowchart illustrating steps performed in an illustrative method. Other embodiments may include more or fewer steps, and/or different steps. FIG. 8 depicts multiple steps of a method, generally indicated at 700, which may be performed in conjunction with either of systems 20 or 100. Although various steps of method 700 are described below and depicted in FIG. 8, the steps need not necessarily all be performed, and in some cases may be performed in a different order than the order shown.

Method 700 may include a step 702 of communicating by a first computer with a second computer over a network (e.g., network 108—see FIG. 3) during selected frames of a plurality of frames, with each frame having a respective frame duration, for example, as is shown in FIG. 5 with computer 104 being the first computer and computer 102 being the second computer.

Method 700 may include a step 704 of, during each selected frame of the plurality of frames, receiving by the first computer from the second computer over a first discrete communication link separate from the network a first state indicator signal indicating that the second computer is functional. For example, at step 704, computer 102 may transmit the first state signal indicator over link 118 to computer 104 (and to computer 106). Computer 104 (and computer 106) may receive the first state indicator signal over link 118.

Method 700 may include a step 706 of, during each selected frame of the plurality of frames, transmitting by the first computer to the second computer over the network, a second state indicator signal indicating that the first computer received the first state indicator signal. For example, at step 706, computer 104 may transmit to computer 102 the second state indicator signal over CCDL 110.

An example of an implementation of method 700 is depicted in FIG. 9, which includes a schematic timeline 802 for a representative frame 804 of computer 102, a schematic timeline 806 for a corresponding representative frame 808 of computer 104, and communication over links 116 (e.g., links 118, 120) between the two computers shown with dashed arrows, and communication over network 108 (e.g., CCDL 100) shown with solid line arrows. While FIG. 9 shows an implementation of method 700 in representative frames 804, 808 of computers 102 and 104, method 700 may similarly be implemented in other combinations of the computers of the associated system, and/or in selected frames, such as each frame of a plurality of the frames of the computers. Also, computers 106, 102 and computers 106, 104 may perform an analogous implementation of method 700 similar to what is depicted in FIG. 9 in the plurality of frames.

As indicated in FIG. 9, the first state indicator signal of method 700 may include an assertion signal 810 transmitted on link 118 by computer 102 to computer 104. For example, assertion circuitry of computer 102 may be configured to transmit signal 810 by applying a voltage (or another high signal, or in some cases a low signal) on link 118. As shown, the first state signal indicator of method 700 may (also) include a de-assertion signal 812 transmitted on link 118 by computer 102 to computer 104, which may be transmitted to computer 102 at a later time than signal 810. For example, the assertion circuitry of computer 102 may be configured to transmit signal 812 by ceasing to apply (e.g., assert) the voltage on link 118, or otherwise toggle signal 810 to another signal distinguishable from signal 810.

Similarly, assertion circuitry of computer 104 may be configured to transmit a third state indicator signal from computer 104 to computer 102 over link 120 to indicate that computer 104 is functional. The third state indicator signal may be a toggled signal similar to the first state indicator signal. For example, the third state indicator signal may include an assertion signal 814 transmitted on link 120 by the assertion circuitry of computer 104 to computer 102, and a de-assertion signal 816 transmitted on link 120 by the assertion circuitry of computer 104 to computer 102.

Sensing circuitry of computer 104 may be configured to sense reception of respective signals 810, 812 from computer 102. Similarly, sensing circuitry of computer 102 may be configured to sense reception of respective signals 814, 816 from computer 104.

Computers 102, 104 may be configured to determine a state of their respective (e.g., local) computer functionality, and in some embodiments, such determinations may be made after transmitting and/or receiving associated signals 810, 812, 814, and/or 816. If computer 102 determines that computer 102 is functional, then computer 102 (e.g., the assertion circuitry of computer 102) may transmit an assertion signal 818 over link 118 to computer 104. Similarly, if computer 104 determines that computer 104 is functional, then computer 104 (e.g., the assertion circuitry of computer 104) may transmit an assertion signal 820 over link 120 to computer 102.

Computer 104 may be configured to transmit a CCDL message 822 from computer 104 to computer 102 over CCDL 110, for example, after computer 104 determines whether computer 104 is functional. Message 822 may include a first local computer health value indicating whether computer 104 determined that computer 104 is functional and a first indication of whether computer 104 sensed signals 810, 812 (e.g., toggling of assertion on link 120).

Similarly, computer 102 may be configured to transmit a CCDL message 824 from computer 102 to computer 104 over CCDL 110, for example, after computer 102 determines whether computer 102 is functional. Message 824 may include a second local computer health value indicating whether computer 102 determined that computer 102 is functional, and a second indication of whether computer 102 sensed signals 814, 816 (e.g., toggling of assertion on link 118).

The sensing circuitry of computer 104 may be configured to sense signal 818 from computer 102, which may be received by computer 104 at a time after reception of message 824 by computer 104 in frame 808. Similarly, the sensing circuitry of computer 102 may be configured to sense signal 820 from computer 104, which may be received by computer 102 at a time after reception of message 822 by computer 102 in frame 804.

In some embodiments, if the computers are successfully receiving partner CCDL data over network 108, links 116 may be redundant. However, when one of the computers stops receiving partner CCDL data over network 108, links 116 may enable the one computer to determine whether an associated CCDL failed or whether an associated partner computer failed.

Preferably, operation (or functionality) of an associated link of links 116 may be determined by toggling the associated link (e.g., asserting, then de-asserting the associated link by the associated computer) in a middle portion of each frame, and having the associated partner computer verify that the associated partner computer senses that toggling. In some embodiments, the associated link may be set to (or asserted to) indicate a functional state of the associated computer at a predetermined time in each frame (e.g., during transmission of a synchronization signal by the associated computer).

Figure 10:
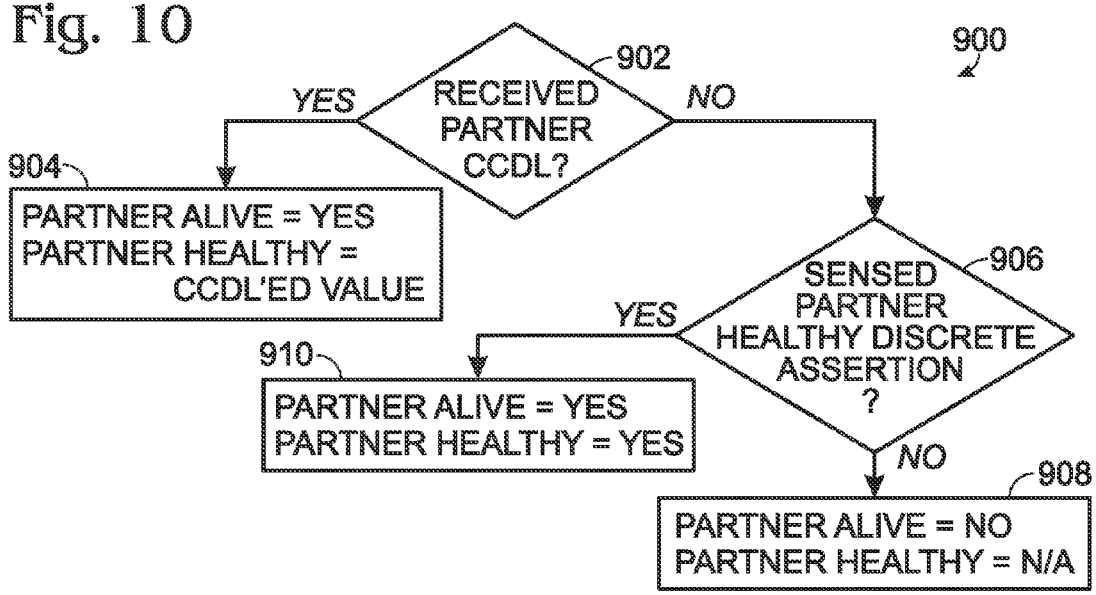
FIG. 10 is a flowchart depicting a method performed by another embodiment.

Computer 104 may be configured to determine whether computer 102 is functional based at least in part on whether computer 104 received message 824, and/or on whether computer 104 sensed signal 818, an example of which is depicted in FIG. 10. Similarly, computer 102 may be configured to determine whether computer 104 is functional based at least in part on whether computer 102 received message 822, and/or on whether computer 102 sensed signal 820.

FIG. 10 is a flowchart illustrating operations performed by one embodiment. Some embodiments may include more or fewer steps or different steps. FIG. 10 depicts multiple steps of a method, generally indicated at 900, which may be performed in conjunction with method 700, system 20, system 100, and/or another system, product, or method described herein. Although various steps of method 900 are described below and depicted in FIG. 10, the steps need not necessarily all be performed, and in some cases may be performed in a different order than the order shown.

Method 900 may be suitable for determining by each computer a functional state of each of the partner computers (e.g., whether each partner computer is online or powered-on, and/or whether each partner computer is operational or "healthy"). For example, method 900 may include a step 902 of determining whether the respective computer received a partner CCDL message. For example, at step 902, the system (e.g., computer 104) may determine that computer 104 received message 824 from computer 102 during frame 808 (see FIG. 9).

If it is determined at step 902 that the respective computer did receive the partner CCDL message, then method 900 may proceed to a step 904 of determining that the associated partner computer is online and is operational. For example, at step 904, computer 104 may set a partner alive status for computer 102 equal to a "Yes" value or other value indicating that computer 102 is online, and may set a partner health value for computer 102 equal to the second local computer health value (e.g., the local computer health value included in CCDL message 824).

However, if it is determined at step 902 that the respective computer did not receive the associated partner CCDL message (e.g., if computer 104 did not receive message 824), then method 900 may proceed to a step 906 of determining whether the respective computer sensed healthy discrete assertion by the associated partner computer. For example, at step 906, computer 104 may determine whether the sensing circuitry of computer 104 sensed signal 818 (e.g., an assertion of link 118, which may be described as an assertion of a healthy discrete) from computer 102.

If it is determined at step 906 that the respective computer did not sense healthy discrete assertion by the associated computer, then method 900 may proceed to a step 908. For example, at step 906, if computer 104 determines that the sensing circuitry of computer 104 did not sense the assertion of signal 818, then method 104 may proceed to step 908.

At step 908, the respective computer may determine that the associated partner is not online. For example, at step 908, computer 104 may set the partner alive status of (or associated with) computer 102 equal to a "No" value or other value indicating that computer 102 is not online. In some embodiments, the associated partner not being online may result in the partner healthy status of that associated partner not being applicable.

However, if it is determined at step 906 that the respective computer did sense healthy discrete assertion by the associated computer, then method 900 may proceed to a step 910 of determining that the associated computer is online, and setting the partner health value equal to a "Yes" value. For example, at step 910, computer 104 may set the partner alive status for computer 102 equal to the "Yes" value, and may set the partner health value for computer 102 equal to the "Yes" value (or another value indicating that computer 102 is functional).

Referring back to FIG. 9, computer 102 may be configured to assess a functional state of link 118, the asserting circuitry of computer 104, and/or the sensing circuitry of computer 104, based at least in part on signals 814, 816, and/or 822. Similarly, computer 102 may be configured to assess a functional state of link 120, the asserting circuitry of computer 102, and/or the sensing circuitry of computer 102, based at least in part on signals 810, 812, and/or 824. For example, based at least in part on a determined number of partner computers that did not sense a respective computer's toggled state indicator signal, and/or at least in part on a determined number of partner computers that did sense the respective computer's toggled state indicator signal, the respective computer of the plurality of computers of the system may be configured to determine whether an associated link of links 116 has become dysfunctional (e.g., has become broken), whether asserting circuitry of the respective computer has become dysfunctional, and/or whether sensing circuitry of another computer (e.g., one of the partner computers) of the plurality of computers has become dysfunctional, an example of which is depicted in FIG. 11.

Figure 11:
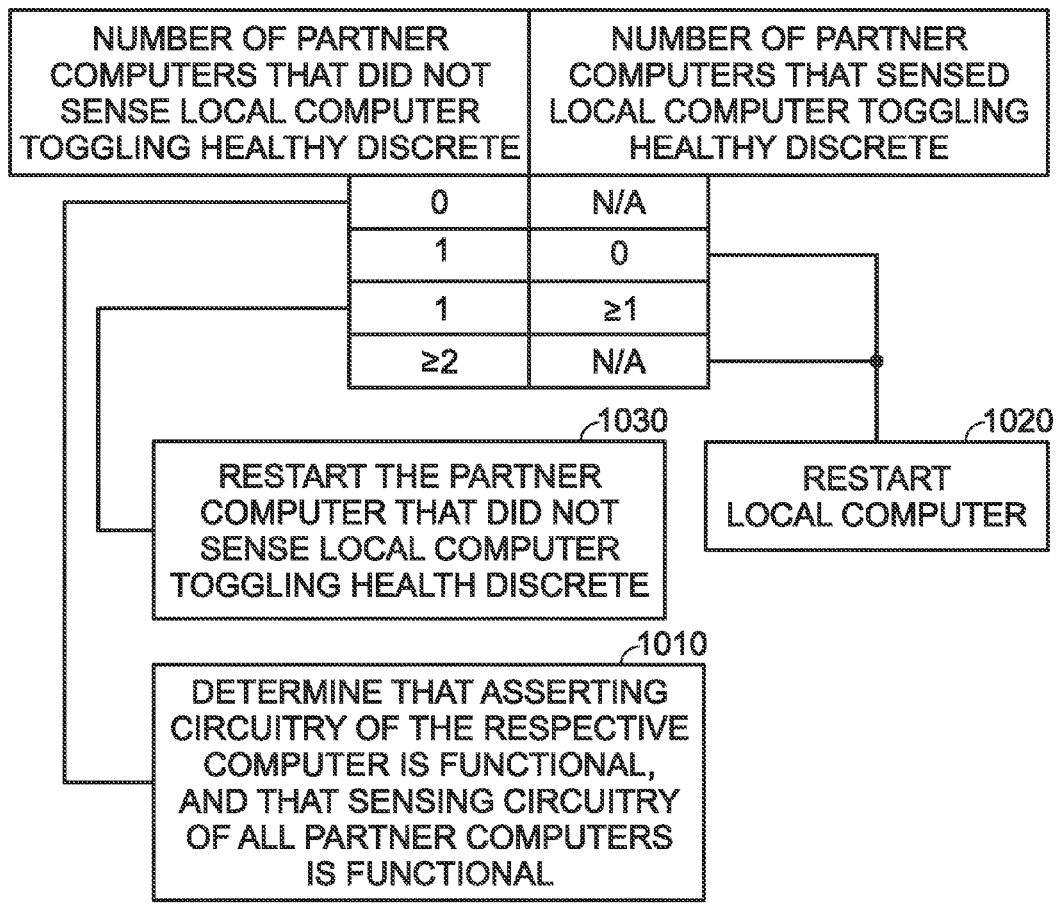
FIG. 11 is another flowchart depicting a method performed by yet another embodiment.

FIG. 11 is a flowchart illustrating operations performed by one embodiment, and depicts multiple steps of a method, generally indicated at 1000, which may be performed in conjunction with method 700, system 20, system 100, and/or another system, product, or method described herein. Although various steps of method 1000 are described below and depicted in FIG. 11, the steps need not necessarily all be performed, and in some cases may be performed in a different order than the order shown.

As mentioned above, in method 1000, the respective computer may determine (and/or identify) the number of partner computers that did not sense the toggling of the respective state indicator signal by the respective computer, and the number of partner computers that did sense the toggling of the respective state indicator signal by the respective computer. This information may be shared among the computers in respective CCDL messages communicated between the computers.

Based on this determination, the system may perform one or more of steps 1010, 1020, 1030. For example, if the respective computer determines that no partner computers did not sense the toggling of the respective state indicator signal by the respective computer (which is to say that all of the computers sensed the toggling), then method 1000 may flow to step 1010 of determining that the asserting circuitry of the respective computer is functional (e.g., not broken or in need of being reset), and that the sensing circuitry of the respective computer is functional. For example, if the second indication received from computer 102 via message 824 by computer 104 indicates that the sensing circuitry of computer 102 sensed both of signals 814, 816, then computer 104 may determine that the asserting circuitry of computer 104 is functional and that the sensing circuitry of computer 102 is functional. Computer 104 may similarly make a determination related to the sensing circuitry of computer 106 based on a similar indication in a similar CCDL message from computer 106.

If the system (e.g., the respective computer) determines that one partner computer did not sense the toggling of the respective state indicator signal by the respective computer and that no partner computers did sense the toggling of the respective state indicator signal by the respective computer, then method 1000 may flow to step 1020 of restarting the respective (e.g., local) computer. However, in some embodiments, the system may be configured to restart the one partner computer did not sense the toggling of the respective state indicator signal if such a determination is made. For example, such a determination may not be sufficient to determine whether the asserting circuitry of the respective computer has become dysfunctional, or whether the sensing circuitry of the one partner computer has become dysfunctional, thus a decision of whether to restart the local computer and/or the one partner computer may be arbitrary.

If the system (e.g., the respective computer) determines that one partner computer did not sense the toggling of the respective state indicator signal by the respective computer and that one or more partner computers did sense the toggling of the respective state indicator signal by the respective computer, then method 1000 may flow to step 1030 of restarting the one partner computer that did not sense the respective computer toggling the respective state indicator signal. For example, such a determination may indicate that the sensing circuitry of the one partner computer has become dysfunctional, in which case, restarting the one partner computer may restore the sensing circuitry of the one partner computer to a functional state.

If the system (e.g., the respective computer) determines that two or more partner computers did not sense the toggling of the respective state indicator signal by the respective computer, then method 1000 may flow to step 1020 and restart the respective (e.g., local) computer. For example, such a determination may indicate that the asserting circuitry of the respective computer has become dysfunctional, in which case, restarting the respective computer may restore the asserting circuitry of the respective computer to a functional state.

Example 5

This section describes additional aspects and features of disclosed embodiments, presented without limitation as a series of enumerated paragraphs. Each of these paragraphs can be combined with one or more other paragraphs, and/or with other disclosure in this document, in any suitable manner. Some of the paragraphs below expressly refer to and further limit other paragraphs, providing without limitation examples of some of the suitable combinations.

A0. A method comprising: during a first frame having a first frame duration, communicating by a first computer with a second computer over a network; during the first frame, transmitting a first synchronization signal from the first computer to the second computer; receiving by the first computer during the first frame a second synchronization signal received from the second computer; determining by the first computer a first elapsed time between a time when the first synchronization signal was transmitted by the first computer and a time when the second synchronization signal was received by the first computer; and determining by the first computer a duration for a second frame based at least in part on the first elapsed time.

A1. The method according to paragraph A0, wherein transmitting a first synchronization signal includes transmitting the first synchronization signal at a first predetermined time after initiating the first frame, and the method further comprising determining by the first computer a second predetermined time after initiating the second frame for transmitting a third synchronization signal from the first computer to the second computer based at least in part on the first elapsed time.

A2. The method according to paragraph A0, further comprising, during the first frame, transmitting from the first computer to a third computer over the network, a third synchronization signal; receiving a fourth synchronization signal by the first computer from the third computer during the first frame; and determining by the first computer a second elapsed time between a time when the third synchronization signal was transmitted by the first computer and a time when the fourth synchronization signal was received by the first computer; and wherein determining by the first computer a duration for a second frame includes determining by the first computer the duration for the second frame based also at least in part on the second elapsed time.

A3. The method according to paragraph A0, further comprising receiving by the first computer from the second computer a second elapsed time between a time when the second synchronization signal was transmitted by the second computer to the first computer and a time when the first synchronization signal was received by the second computer, and comparing the first elapsed time to the second elapsed time; and wherein determining by the first computer a duration for a second frame includes determining the duration for the second frame based at least in part on the comparison of the first elapsed time to the second elapsed time.

A4. The method according to paragraph A3, wherein determining by the first computer a duration for a second frame includes determining by the first computer the duration for the second frame based at least in part on comparisons of respective elapsed times for each of a plurality of frames occurring prior to the second frame, each respective elapsed time being a time between transmitting a corresponding synchronization signal from one of the first and second computers to the other of the first and second computers and receiving a corresponding synchronization signal from the other of the first and second computers by the one of the first and second computers.

A5. The method according to paragraph A3, further comprising, during the first frame, transmitting from the first computer to the third computer over the network, a third synchronization signal; receiving by the first computer during the first frame a fourth synchronization signal received from the third computer; determining by the first computer a third elapsed time between a time when the third synchronization signal was transmitted by the first computer and a time when the fourth synchronization signal was received by the first computer; and comparing the first elapsed time to the third elapsed time; and wherein determining by the first computer a duration for a second frame includes determining the duration for the second frame based also at least in part on the comparison of the first elapsed time to the third elapsed time.

A6. The method according to paragraph A0, further comprising during each of a plurality of frames including the first frame, receiving by the first computer from the second computer over a first discrete communication link separate from the network a first state indicator signal indicating that the second computer is functional.

A7. The method according to paragraph A6, further comprising, during each frame, transmitting by the first computer to the second computer over the network, a second state indicator signal indicating that the first computer received the first state indicator signal.

A8. The method according to paragraph A7, wherein transmitting by the first computer to the second computer over the network, a second state indicator signal includes transmitting by the first computer to the second computer over the network, the second state indicator signal also indicating that the first computer is functional.

A9. The method according to paragraph A8, further comprising during each frame, transmitting by the first computer to the second computer over a second discrete communication link separate from the network and the first discrete communication link, a third state indicator signal also indicating that the first computer is functional.

B0. A method comprising: during each frame of a plurality of frames, with each frame having a respective frame duration, communicating by a first computer with a second computer over a network; during each frame, receiving by the first computer from the second computer over a first discrete communication link separate from the network a first state indicator signal indicating that the second computer is functional; and during each frame, transmitting by the first computer to the second computer over the network, a second state indicator signal indicating that the first computer received the first state indicator signal.

B1. The method according to paragraph B0, wherein transmitting a second state indicator signal includes transmitting the second state indicator signal also indicating that the first computer is functional.

B2. The method according to paragraph B1, further comprising during each frame, transmitting by the first computer to the second computer over a second discrete communication link separate from the network and the first discrete communication link, a third state indicator signal also indicating that the first computer is functional.

C0. A computer system, comprising: a processor; a storage device; and a program comprising a plurality of instructions stored in the storage device that are executed by the processor to: during a first frame having a first frame duration, communicate by a first computer with a second computer over a network; during the first frame, transmit a first synchronization signal from the first computer to the second computer; receive by the first computer during the first frame a second synchronization signal received from the second computer; determine by the first computer a first elapsed time between a time when the first synchronization signal was transmitted by the first computer and a time when the second synchronization signal was received by the first computer; and determine by the first computer a duration for a second frame based at least in part on the first elapsed time.

C1. The computer system of paragraph C0, wherein the plurality of instructions further comprises instructions that are executed by the processor to transmit the first synchronization signal at a first predetermined time after initiating the first frame, and determine by the first computer a second predetermined time after initiating the second frame for transmitting a third synchronization signal from the first computer to the second computer based at least in part on the first elapsed time.

C2. The computer system of paragraph C0, wherein the plurality of instructions further comprises instructions that are executed by the processor to: during the first frame, transmit from the first computer to a third computer over the network, a third synchronization signal; receive a fourth synchronization signal by the first computer from the third computer during the first frame; and determine by the first computer a second elapsed time between a time when the third synchronization signal was transmitted by the first computer and a time when the fourth synchronization signal was received by the first computer; and wherein determining by the first computer a duration for a second frame includes determining by the first computer the duration for the second frame based also at least in part on the second elapsed time.

C3. The computer system of paragraph C0, wherein the plurality of instructions further comprises instructions that are executed by the processor to receive by the first computer from the second computer a second elapsed time between a time when the second synchronization signal was transmitted by the second computer to the first computer and a time when the first synchronization signal was received by the second computer, compare the first elapsed time to the second elapsed time; and determine the duration for the second frame based at least in part on the comparison of the first elapsed time to the second elapsed time.

D0. A computer program product, comprising: at least one computer readable storage medium having computer readable program instructions embodied therewith, the computer readable program instructions, when read by a processor, being configured to: during a first frame having a first frame duration, communicate by a first computer with a second computer over a network; during the first frame, transmit a first synchronization signal from the first computer to the second computer; receive by the first computer during the first frame a second synchronization signal received from the second computer; determine by the first computer a first elapsed time between a time when the first synchronization signal was transmitted by the first computer and a time when the second synchronization signal was received by the first computer; and determine by the first computer a duration for a second frame based at least in part on the first elapsed time.

D1. The computer program product of paragraph D0, wherein the computer readable program instructions, when read by the processor are further configured to transmit the first synchronization signal at a first predetermined time after initiating the first frame, and determine by the first computer a second predetermined time after initiating the second frame for transmitting a third synchronization signal from the first computer to the second computer based at least in part on the first elapsed time.

D2. The computer program product of paragraph D0, wherein the computer readable program instructions, when read by the processor are further configured to: during the first frame, transmit from the first computer to a third computer over the network, a third synchronization signal; receive a fourth synchronization signal by the first computer from the third computer during the first frame; and determine by the first computer a second elapsed time between a time when the third synchronization signal was transmitted by the first computer and a time when the fourth synchronization signal was received by the first computer; and wherein determining by the first computer a duration for a second frame includes determining by the first computer the duration for the second frame based also at least in part on the second elapsed time.

Advantages, Features, Benefits

The different embodiments of the disclosure described herein provide several advantages over known solutions for synchronizing frames of a plurality of computers and/or indicating that a computer of the plurality of computers is functional. For example, the illustrative embodiments of the disclosure described herein may allow for increased throughput of and sharing between the computers of the plurality of computers while synchronizing corresponding frames, may allow for fewer wires and circuitry in associated systems, may reduce failure modes, may widen a "wait window" for receipt of partner computers' synchronization signals with no negative consequences (e.g. no loss of computing throughput during these windows of time), and/or may provide robust and continuous verification of sensing and asserting circuitry. Additionally, and among other benefits, illustrative embodiments of the disclosure described herein may allow for the computers to differentiate between link failure and computer failure, sufficiently isolate computers which are determined to not be currently functional, and/or restarting or resetting one or more computers to restore such computers to a functional state. However, not all embodiments described herein provide the same advantages or the same degree of advantage.

CONCLUSION

The disclosure set forth above may encompass multiple distinct embodiments with independent utility. Although each of these embodiments has been disclosed in its preferred form(s), the specific embodiments thereof as disclosed and illustrated herein are not to be considered in a limiting sense, because numerous variations are possible. The subject matter of the embodiments includes all novel and nonobvious combinations and subcombinations of the various elements, features, functions, and/or properties disclosed herein. The following claims particularly point out certain combinations and subcombinations regarded as novel and nonobvious. Embodiments of other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the embodiments of the present disclosure.

What is claimed is:

1. A method comprising:
during a first frame having a first frame duration, communicating by a first computer with a second computer over a network;
during the first frame, transmitting a first synchronization signal from the first computer to the second computer;
receiving by the first computer during the first frame a second synchronization signal received from the second computer;
determining by the first computer a first elapsed time between a time when the first synchronization signal was transmitted by the first computer and a time when the second synchronization signal was received by the first computer; and
determining by the first computer a duration for a second frame based at least in part on the first elapsed time.

2. The method according to claim 1, wherein transmitting a first synchronization signal includes transmitting the first synchronization signal at a first predetermined time after initiating the first frame, and the method further comprising determining by the first computer a second predetermined time after initiating the second frame for transmitting a third synchronization signal from the first computer to the second computer based at least in part on the first elapsed time.

3. The method according to claim 1, further comprising:
during the first frame, transmitting from the first computer to a third computer over the network, a third synchronization signal;
receiving a fourth synchronization signal by the first computer from the third computer during the first frame; and
determining by the first computer a second elapsed time between a time when the third synchronization signal was transmitted by the first computer and a time when the fourth synchronization signal was received by the first computer; and
wherein determining by the first computer a duration for a second frame includes determining by the first computer the duration for the second frame based also at least in part on the second elapsed time.

4. The method according to claim 1, further comprising receiving by the first computer from the second computer a second elapsed time between a time when the second synchronization signal was transmitted by the second computer to the first computer and a time when the first synchronization signal was received by the second computer, and comparing the first elapsed time to the second elapsed time; and wherein determining by the first computer a duration for a second frame includes determining the duration for the second frame based at least in part on the comparison of the first elapsed time to the second elapsed time.

5. The method according to claim 4, wherein determining by the first computer a duration for a second frame includes determining by the first computer the duration for the second frame based at least in part on comparisons of respective elapsed times for each of a plurality of frames occurring prior to the second frame, each respective elapsed time being a time between transmitting a corresponding synchronization signal from one of the first and second computers to the other of the first and second computers and receiving a corresponding synchronization signal from the other of the first and second computers by the one of the first and second computers.

6. The method according to claim 4, further comprising:
during the first frame, transmitting from the first computer to the third computer over the network, a third synchronization signal;
receiving by the first computer during the first frame a fourth synchronization signal received from the third computer;
determining by the first computer a third elapsed time between a time when the third synchronization signal was transmitted by the first computer and a time when the fourth synchronization signal was received by the first computer; and
comparing the first elapsed time to the third elapsed time; and
wherein determining by the first computer a duration for a second frame includes determining the duration for the second frame based also at least in part on the comparison of the first elapsed time to the third elapsed time.

7. The method according to claim 1, further comprising during each of a plurality of frames including the first frame, receiving by the first computer from the second computer over a first discrete communication link separate from the network a first state indicator signal indicating that the second computer is functional.

8. The method according to claim 7, further comprising, during each frame, transmitting by the first computer to the second computer over the network, a second state indicator signal indicating that the first computer received the first state indicator signal.

9. The method according to claim 8, wherein transmitting by the first computer to the second computer over the network, a second state indicator signal includes transmitting by the first computer to the second computer over the network, the second state indicator signal also indicating that the first computer is functional.

10. The method according to claim 9, further comprising during each frame, transmitting by the first computer to the second computer over a second discrete communication link separate from the network and the first discrete communication link, a third state indicator signal also indicating that the first computer is functional.

11. A computer system, comprising:
a processor;
a storage device; and
a program comprising a plurality of instructions stored in the storage device that are executed by the processor to:
during a first frame having a first frame duration, communicate by a first computer with a second computer over a network;
during the first frame, transmit a first synchronization signal from the first computer to the second computer;
receive by the first computer during the first frame a second synchronization signal received from the second computer;
determine by the first computer a first elapsed time between a time when the first synchronization signal was transmitted by the first computer and a time when the second synchronization signal was received by the first computer; and
determine by the first computer a duration for a second frame based at least in part on the first elapsed time.

12. The computer system of claim 11, wherein the plurality of instructions further comprises instructions that are executed by the processor to transmit the first synchronization signal at a first predetermined time after initiating the first frame, and determine by the first computer a second predetermined time after initiating the second frame for transmitting a third synchronization signal from the first computer to the second computer based at least in part on the first elapsed time.

13. The computer system of claim 11, wherein the plurality of instructions further comprises instructions that are executed by the processor to:
during the first frame, transmit from the first computer to a third computer over the network, a third synchronization signal;
receive a fourth synchronization signal by the first computer from the third computer during the first frame; and
determine by the first computer a second elapsed time between a time when the third synchronization signal was transmitted by the first computer and a time when the fourth synchronization signal was received by the first computer; and
wherein determining by the first computer a duration for a second frame includes determining by the first computer the duration for the second frame based also at least in part on the second elapsed time.

14. The computer system of claim 11, wherein the plurality of instructions further comprises instructions that are executed by the processor to receive by the first computer from the second computer a second elapsed time between a time when the second synchronization signal was transmitted by the second computer to the first computer and a time when the first synchronization signal was received by the second computer, compare the first elapsed time to the second elapsed time; and determine the duration for the second frame based at least in part on the comparison of the first elapsed time to the second elapsed time.

15. A computer program product, comprising:
at least one computer readable storage medium having computer readable program instructions embodied therewith, the computer readable program instructions, when read by a processor, being configured to:
during a first frame having a first frame duration, communicate by a first computer with a second computer over a network;
during the first frame, transmit a first synchronization signal from the first computer to the second computer;
receive by the first computer during the first frame a second synchronization signal received from the second computer;
determine by the first computer a first elapsed time between a time when the first synchronization signal was transmitted by the first computer and a time when the second synchronization signal was received by the first computer; and
determine by the first computer a duration for a second frame based at least in part on the first elapsed time.

16. The computer program product of claim 15, wherein the computer readable program instructions, when read by the processor are further configured to transmit the first synchronization signal at a first predetermined time after initiating the first frame, and determine by the first computer a second predetermined time after initiating the second frame for transmitting a third synchronization signal from the first computer to the second computer based at least in part on the first elapsed time.

17. The computer program product of claim 15, wherein the computer readable program instructions, when read by the processor are further configured to:
during the first frame, transmit from the first computer to a third computer over the network, a third synchronization signal;
receive a fourth synchronization signal by the first computer from the third computer during the first frame; and
determine by the first computer a second elapsed time between a time when the third synchronization signal was transmitted by the first computer and a time when the fourth synchronization signal was received by the first computer; and
wherein determining by the first computer a duration for a second frame includes determining by the first computer the duration for the second frame based also at least in part on the second elapsed time.

* * * * *